United States Patent [19]
Watanabe et al.

[11] Patent Number: 5,754,681
[45] Date of Patent: May 19, 1998

[54] SIGNAL PATTERN RECOGNITION APPARATUS COMPRISING PARAMETER TRAINING CONTROLLER FOR TRAINING FEATURE CONVERSION PARAMETERS AND DISCRIMINANT FUNCTIONS

[75] Inventors: Hideyuki Watanabe, Soraku-Gun; Tsuyoshi Yamaguchi, Tsuzuki-Gun; Shigeru Katagiri, Ikoma-Gun, all of Japan

[73] Assignee: ATR Interpreting Telecommunications Research Laboratories, Kyoto, Japan

[21] Appl. No.: 493,719

[22] Filed: Jun. 22, 1995

[30] Foreign Application Priority Data

Oct. 5, 1994 [JP] Japan .................. 6-241255

[51] Int. Cl.⁶ ........................................ G06K 9/62
[52] U.S. Cl. ..................... 382/159; 382/190; 382/224; 395/2.4; 395/24
[58] Field of Search ..................... 395/2.4–2.49, 395/23, 24, 22; 382/181, 197, 224, 155–160, 190

[56] References Cited

U.S. PATENT DOCUMENTS

| | | | |
|---|---|---|---|
| 4,783,802 | 11/1988 | Takebayashi et al. | 395/2.52 |
| 5,239,594 | 8/1993 | Yoda | 382/155 |
| 5,249,067 | 9/1993 | Hirosawa | 358/456 |
| 5,440,662 | 8/1995 | Sukka | 395/2.45 |
| 5,479,570 | 12/1995 | Imagawa et al. | 395/20 |
| 5,602,938 | 2/1997 | Akiyama et al. | 382/155 |

OTHER PUBLICATIONS

"Subspace Methods of Pattern Recognition", E. Oja, Research Studies Press, 1983, pp. 73–125.

"Fundamentals of Speech Recognition", L. Rabiner et al, PTR Prentice–Hall, Inc. 1993 pp. 69–123.

"New Discriminative Training Algorithms Based on the Generalized Probabilistic Descent Method", Katagiri et al, in proc. 1991 IEEE Workshop on Neural Networks for Signal Processing, pp. 299–308.

"Hidden Markov Models for Speech Recognition", X. D. Huang et al, Edinburgh University Press, 1990, pp. 166–185.

"Discriminative Learning for Minimum Error Classification", by B. H. Juang et al, IEEE Transactions on Signal Processing, vol. 40, No. 12, pp. 3043–3054, Dec. 1992.

(List continued on next page.)

*Primary Examiner*—Yon Couso
*Assistant Examiner*—Ha Tran Nguyen
*Attorney, Agent, or Firm*—Birch, Stewart, Kolasch & Birch, LLP

[57] ABSTRACT

In a signal pattern recognition apparatus, a plurality of feature transformation sections respectively transform an inputted signal pattern into vectors in a plurality of feature spaces corresponding respectively to predetermined classes using a predetermined transformation parameter corresponding to each of the classes so as to emphasize a feature of each of the classes, and a plurality of discriminant function sections respectively calculates a value of a discriminant function using a predetermined discriminant function representing a similarity measure of each of the classes for the transformed vectors in the plurality of feature spaces. Then, a selection section executes a signal pattern recognition process by selecting a class to which the inputted signal pattern belongs based on the calculated values of a plurality of discriminant functions corresponding respectively to the classes, and a training control section trains and sets a plurality of transformation parameters of the feature transformation process and a plurality of discriminant functions so that an error probability of the signal pattern recognition is minimized based on a predetermined training signal pattern.

16 Claims, 7 Drawing Sheets

OTHER PUBLICATIONS

"Pattern Classification and Scene Analysis", by R. O. Duda et al, A Wiley–Interscience Publication, pp. 10–39, and 114–121, 130–159, 1973.

"Matrix Computations", by G. H. Golub et al, The Johns Hopkins University Press, 1989, pp. 444–459.

"Segmental GPD Training of HMM Based Speech Controller", W. Chou et al, Proceedings of ICASSP 1992, IEEE, vol. 1, pp. 473–476.

"Minimum Error Classification Training of HMMs—Implementation Details and Experimental Results", Rainton, et al., Japanese Acoustic Society, vol. 13, No. 6, pp. 379–387, Nov. 1992.

"Feature Extraction Based on Minimum Classification Error/Generalized Probabilistic Descent Method", Brem et al, Proceedings of ICASSP 1993, IEEE, vol. 2, pp. 275–278, Apr. 1993.

"Pattern Recognition Engineering" by Jun–ichi Toriwaki, edited by the Institute of Television Engineers of Japan, Corona Publishing Co., Ltd., Mar. 15, 1993, pp. 24–27, 30–33, 95–99, 104–107, 224.

"Information Statistics" by Yoshiyuki Sakamoto et al, Lecture of information science A.5.5, Kyoritsu Shuppan, Jan 15, 1983, pp. 27–44.

○ : Signal Pattern of Class #1
△ : Signal Pattern of Class #2
? : Unknown Signal Pattern whose Real Class is #1

Original Space

Metric Space of Class #1

Metric Space of Class #2

SIGNAL PATTERN RECOGNITION APPARATUS COMPRISING PARAMETER TRAINING CONTROLLER FOR TRAINING FEATURE CONVERSION PARAMETERS AND DISCRIMINANT FUNCTIONS

BACKGROUND OF THE INVENTION

1. Field of the Invention

The present invention relates to a signal pattern recognition apparatus and a method for recognizing a signal pattern, and in particular, to a signal pattern recognition apparatus for recognizing a signal pattern, which can be expressed by numerical values and belongs to a class of information, such as a speech signal pattern, a character signal pattern, an image signal pattern or the like, said signal pattern recognition apparatus comprising a parameter training controller for training feature conversion parameters and discriminant functions, and a method for recognizing a signal pattern, said method including a step of training feature conversion parameters and discriminant functions.

2. Description of the Related Art

Basically, a signal pattern recognition such as a speech recognition, a character recognition, an image recognition or the like can be comprehended as a matter of classifying a signal pattern which is a quantity obtained by numerically observing an object to be recognized such as a speech signal, a character signal, an image signal or the like into one of predetermined classes so as to establish a correspondence therebetween. The signal pattern recognition is basically composed of a feature extraction section 1 and a classification section 2 as shown in FIG. 2. In this case, the feature extraction section 1 transforms an inputted signal pattern such as a speech, a character, or an image containing a high-dimension observed value including information unnecessary for the recognition, into a feature value, or a low-dimension information representing a class identity required for the signal pattern recognition. Thereafter, the classification section 2 classifies the feature value obtained through the transformation into a predetermined class so as to establish a correspondence therebetween, and outputs a classification result.

The classification section 2 fundamentally comprises a plurality of K discriminant function calculators 3-1 through 3-K, and a selector 4 as shown in FIG. 3. By previously determining a membership of an inputted feature value to each class or a "discriminant function" representing a similarity measure of each class, and making the inputted signal pattern correspond to a class in which the value of the discriminant function is maximized or minimized, the classifying process is executed. In other words, a feature vector x of the inputted signal pattern is inputted to each of the discriminant function calculators 3-1 through 3-K having respective predetermined discriminant functions, and the discriminant function calculators 3-1 through 3-K respectively calculate discriminant function values by means of the respective predetermined discriminant functions, and output the resulting values to the selector 4. The selector 4 selects a predetermined maximum or minimum discriminant function value among a plurality of K discriminant function values, and then, outputs the information of the class designated by the discriminant function calculator which has outputted the selected discriminant function value as a classification result. Thus, the signal pattern recognition has been conventionally performed by training the discriminant functions of the respective discriminant function calculators 3-1 through 3-K by means of a set of training samples whose classes have been known, and recognizing new unknown samples which are not always included in the set of the training samples.

Furthermore, there has been conventionally provided only one feature extraction section 1, which transforms an inputted signal pattern into a predetermined feature space, for a plurality of K discriminant function calculators 3-1 through 3-K in a manner as shown in FIG. 4. In other words, one feature space is given commonly to all the classes. It is to be herein noted that the feature transformation performed by the feature extraction section 1 is set a priori independently of the setting of the discriminant functions in the classification section 2, and the discriminant functions are set by the classification section 2 after the feature space obtained by the feature extraction section 1 is given thereto.

In regard to the signal pattern recognition, a variety of excellent feature extraction methods have been proposed and put into practice. A statistical linear feature extraction method represented by Karhunen-Loève (KL) transformation and multiple discriminant analysis has been extensively used mainly in the field of character and image recognition because of its rigorous mathematical ground and simplicity of calculation (See, for example, Erkki Oja, "Subspace Methods of Pattern Recognition", translated by Hidemitsu Ogawa and Makoto Sato, Sangyo Tosho, 1986 (referred to as a Reference Document 1 hereinafter), or Jun-ichi Toriwaki, "Pattern Recognition Engineering", compiled by The Institute of Television Engineers of Japan, CORONA PUBLISHING CO., LTD., 1993 (referred to as a Reference Document 2 hereinafter). In particular, as a speech feature extraction method in the field of speech recognition, there are known a short-time power spectrum based on Fourier transformation, a linear prediction analysis (LPC) method, and a cepstrum method (See, for example, L. Rabiner and B. H. Juang, "Fundamentals of Speech Recognition", Prentice-Hall International Inc., 1993 (referred to as a Reference Document 3 hereinafter). The above-mentioned methods can efficiently express the linguistic feature of a speech required for class classification in a relatively low dimension, and therefore, each of the methods is often used as a feature extraction method in the current speech recognition apparatuses.

However, in an actual environment when using a signal pattern recognition system, the above-mentioned excellent feature values change due to a variety of factors even in an identical class. For instance, in the case of speech recognition, for example, a difference of speaker and a difference of speaking style such as a difference of utterance speed and a difference of coarticulation, and a difference of acoustic environment such as background noise can be enumerated as important variation factors. The above-mentioned fact causes deterioration of a capability in speaker independence and reduction of noise resistance of the speech recognition apparatus. In a practical situation, training of the speech recognition apparatus for making the apparatus have a good recognition capability for unknown samples different from the training samples used for the training of the speech recognition apparatus is intrinsically important. In order to achieve the above-mentioned purpose, it is important to analyze the statistical variation of the feature value in each class. Conventionally, as a basic technique for expressing a variation of a feature value, there has been often used a so-called multiple template technique for assigning a plurality of templates which are reference vectors to respective classes. The above-mentioned technique includes a method for achieving classification by a distance from a plurality of templates such as learning vector quantization (LVQ) (See, for example, S. Katagiri, C. H. Lee, and B. H. Juang, "New discriminative training algorithms based on the generalized probabilistic descent method", Proceedings of 1991 IEEE Workshop on Neural Networks for Signal Processing, pp. 299–308, Prinston, N.J. in U.S.A., in September, 1991 (referred to as a Reference Document 4 hereinafter)) and a method based on the Hidden Markov Model (HMM) according to a mixture Gaussian distribution (See, for example, the Reference Document 3, or X. D. Huang, Y. Ariki, and M. A. Jack, "Hidden Markov Models for Speech Recognition", Edinburgh University Press, Edinburgh, 1990 (referred to as a Reference Document 5 hereinafter)). According to the above-mentioned multiple template techniques, when the number of templates is increased for the purpose of smartly expressing the variation, the number of parameters to be simultaneously adjusted increases. Therefore, the parameters are excessively adjusted by a finite number of training samples resulting in an over-training, thereby causing such a problem that an accuracy in recognizing unknown samples deteriorates. For the above-mentioned reasons, there is often adopted a means for preventing the deterioration of the accuracy in recognizing the unknown samples by reducing the number of parameters as far as possible, thereby suppressing the accuracy in recognizing the training samples. However, the optimization in number of the parameters is a difficult problem, and therefore, the optimization therein is normally performed heuristically.

The conventional signal pattern recognition apparatus shown in FIG. 4 employs the feature extraction section 1 which is empirically trained independently of the classification section 2 as well as a discriminant function given a priori. The thus obtained signal pattern recognition result is such that neither the feature extraction nor the discriminant function is consistent with the original purpose or goal of the signal pattern recognition of minimizing the recognition error. Therefore, it is not guaranteed to ensure the optimal state in terms of the recognition accuracy, resulting in a problem that the recognition accuracy is relatively low. Furthermore, it is originally desired for the signal pattern recognition apparatus to correctly recognize any unknown inputted signal pattern not used in the training stage. However, an inputted signal pattern which can be correctly recognized by the signal pattern recognition using the feature extraction and the discriminant function given a priori is theoretically only an inputted signal pattern used in a training stage. Since the above-mentioned methods based on the empirical or a priori feature training and the metric training is not consistent with the recognition results, there has been such a problem that a rational measure concerning an improvement of a robustness of training for an unknown signal pattern, or concretely a mathematical measure can be hardly taken.

SUMMARY OF THE INVENTION

An essential object of the present invention is therefore to provide a signal pattern recognition apparatus capable of recognizing an unknown inputted signal pattern which is not used in the training stage, with a signal pattern recognition accuracy greater than that of the conventional apparatus.

Another object of the present invention is to provide a method for recognizing a signal pattern, capable of recognizing an unknown inputted signal pattern which is not used in the training stage, with a signal pattern recognition accuracy greater than that of the conventional method.

In order to achieve the above-mentioned objective, according to one aspect of the present invention, there is provided a signal pattern recognition apparatus for classifying an inputted signal pattern into one of a plurality of predetermined classes so as to recognize the inputted signal pattern, comprising:

a plurality of feature transformation means for respectively transforming the inputted signal pattern into vectors in a plurality of feature spaces corresponding respectively to said classes by executing a feature transformation process by means of a predetermined transformation parameter corresponding to each of said classes so as to emphasize a feature of each of said classes, said feature transformation means being provided respectively for said plurality of classes;

a plurality of discriminant function means for respectively calculating a value of a discriminant function by means of a predetermined discriminant function representing a similarity measure of each of said classes for said vectors in said plurality of feature spaces which are transformed by said plurality of feature transformation means, said discriminant function means being provided respectively for said plurality of classes;

selection means for executing a signal pattern recognition process by selecting a class to which the inputted signal pattern belongs based on the values of said plurality of discriminant functions corresponding respectively to said classes, said discriminant functions being obtained through said calculation executed by said plurality of discriminant function means; and training control means for training and setting said plurality of transformation parameters of said feature transformation process and said plurality of discriminant functions, so that an error probability of said signal pattern recognition is minimized based on a predetermined training signal pattern.

In the above-mentioned signal pattern recognition apparatus, each of said plurality of feature transformation means preferably linearly transforms the inputted signal pattern into vectors in said plurality of feature spaces corresponding respectively to said classes by projecting the inputted signal pattern onto a predetermined basis vector and multiplying a resulting vector by a predetermined real number.

In the above-mentioned signal pattern recognition apparatus, each of said plurality of discriminant functions of the discriminant function means is preferably a predetermined quadric discriminant function representing the similarity measure of each of said classes.

In the above-mentioned signal pattern recognition apparatus, said training control means preferably performs adaptation of said plurality of transformation parameters of said feature transformation process and said plurality of discriminant functions of the discriminant function means, so that the error probability of said signal pattern recognition is minimized, based on said predetermined training signal pattern, by means of an adaptive minimization method utilizing a probabilistic descent theorem.

The signal pattern recognition apparatus preferably further comprises:

signal conversion means for converting an inputted speech into a speech signal and outputting the speech signal; and feature extraction means for converting the speech signal outputted from said signal conversion means into a predetermined speech feature parameter, and outputting the obtained feature parameter as a signal pattern to said plurality of feature transformation means and said training control means, thereby recognizing the inputted speech.

In the above-mentioned signal pattern recognition apparatus, said feature extraction means transforms the speech signal outputted from said signal conversion means into LPC cepstrum coefficient vectors through linear prediction analysis, and outputting resulting vectors as a signal pattern to said plurality of feature transformation means and said training control means.

The above-mentioned signal pattern recognition apparatus preferably further comprises:

image conversion means for converting a character into dot image data, and outputting the dot image data as a signal pattern to said plurality of feature transformation means and said training control means, thereby recognizing the character.

The above-mentioned signal pattern recognition apparatus preferably further comprises:

further image conversion means for converting an image into dot image data, and outputting the dot image data as a signal pattern to said plurality of feature transformation means and said training control means, thereby recognizing the image.

According to another aspect of the present invention, there is provided a method for classifying an inputted signal pattern into one of a plurality of predetermined classes so as to recognize the inputted signal pattern, including the following steps of:

transforming the inputted signal pattern into vectors in a plurality of feature spaces corresponding respectively to said classes by executing a feature transformation process by means of a predetermined transformation parameter corresponding to each of said classes so as to emphasize a feature of each of said classes;

calculating a value of a discriminant function by means of a predetermined discriminant function representing a similarity measure of each of said classes for said vectors in said plurality of feature spaces which are obtained through said feature transformation process;

executing a signal pattern recognition process by selecting a class to which the inputted signal pattern belongs based on the calculated values of said plurality of discriminant functions corresponding respectively to said classes; and training and setting the transformation parameter of said feature transformation process and each of said discriminant functions, so that an error probability of said signal pattern recognition is minimized based on a predetermined training signal pattern.

In the above-mentioned method, said transforming step preferably includes a step of linearly transforming the inputted signal pattern into vectors in said plurality of feature spaces corresponding respectively to said classes by projecting the inputted signal pattern onto a predetermined basis vector and multiplying resulting vectors by a predetermined real number.

In the above-mentioned method, each of said discriminant functions is preferably a predetermined quadric discriminant function representing the similarity measure of each of said classes.

In the above-mentioned method, said training step preferably includes a step of performing adaptation of the transformation parameter of said feature transformation process and said discriminant functions, so that the error probability of said signal pattern recognition is minimized, based on the predetermined training signal pattern, by means of an adaptive minimization method utilizing a probabilistic descent theorem.

Therefore, the present invention provides a new apparatus and method for training of the signal pattern recognition apparatus having a higher accuracy in recognizing an unknown signal pattern different from the training signal pattern of the signal pattern recognition apparatus. With the above-mentioned apparatus and method of the present invention, the training can be performed so that a feature metric space for effectively representing the class identity, namely, the metric of the discriminant function inherent in each class is achieved, and the recognition error is reduced. Therefore, in contrast to the conventional practice that a similarity evaluation has been performed in a common feature space in every class, an evaluation is performed in a space inherent in each class for representing the feature of the class in the present invention. With the above-mentioned arrangement, the variation factor can be suppressed in the case of an unknown signal pattern, and the recognition capability is improved to allow a recognition accuracy higher than that of the conventional apparatus to be obtained.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Preferred embodiments according to the present invention will be described below with reference to the attached drawings.

(1) Structure of Signal Pattern Recognition Apparatus

Figure 1:
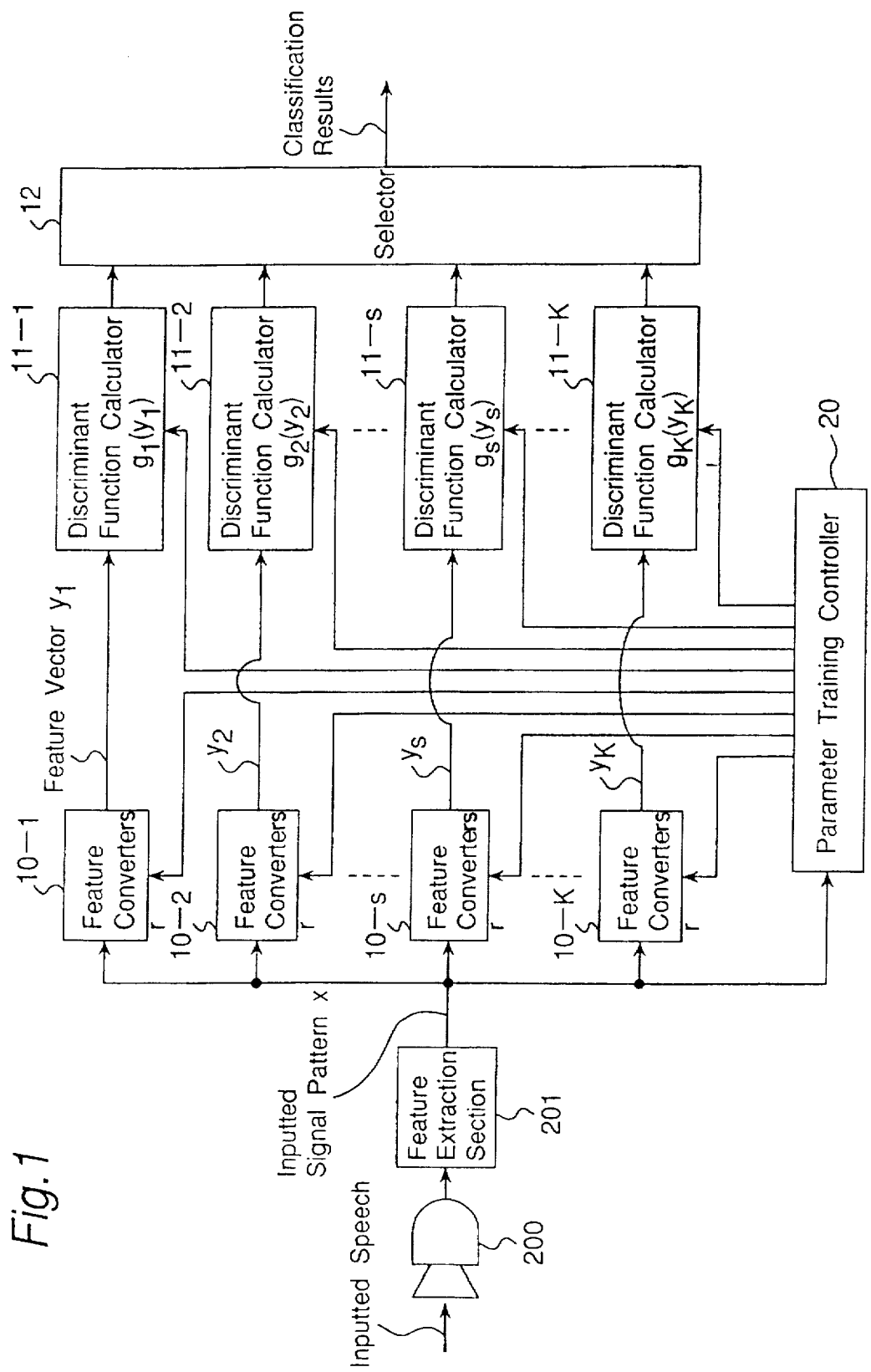
FIG. 1 is a block diagram of a signal pattern recognition apparatus according to a preferred embodiment of the present invention.
Figure 2:
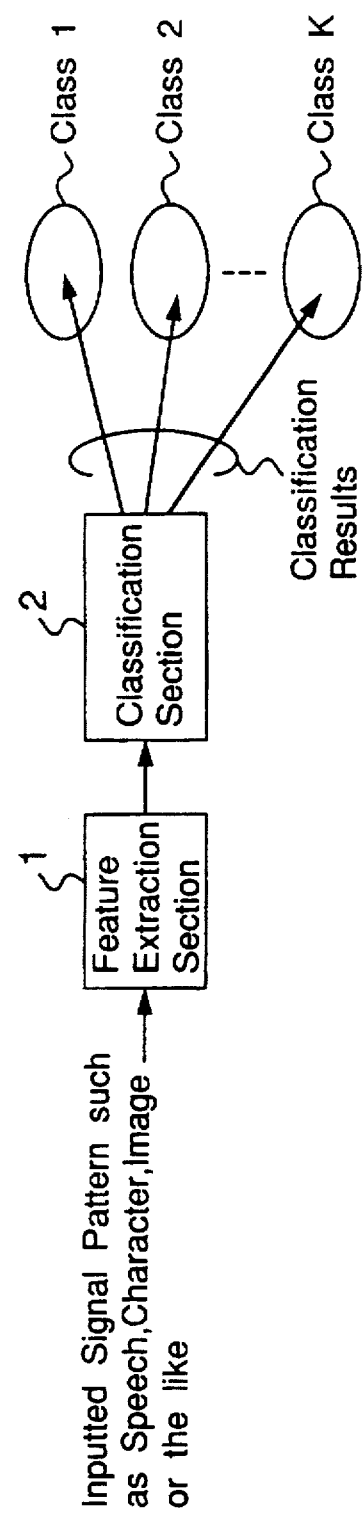
FIG. 2 is a block diagram of a conventional signal pattern recognition apparatus.

FIG. 1 shows a signal pattern recognition apparatus of the present preferred embodiment used as a speech recognition apparatus. The signal pattern recognition apparatus of the present preferred embodiment has a training mode for training apparatus parameters based on a training signal pattern and a recognition mode for executing a recognition process for an unknown signal pattern.

Referring to FIG. 1, the signal pattern recognition apparatus of the preferred embodiment comprises a microphone 200, a feature extraction section 201, a plurality of K feature converters 10-1 through 10-K, a plurality of K discriminant function calculators 11-1 through 11-K, a selector 12, and a parameter training controller 20. In particular, the signal pattern recognition apparatus of the present preferred embodiment has a pair of one feature converter and one discriminant function calculator for respective ones of a plurality of classes for performing a signal pattern recognition classification. Further, the signal pattern recognition apparatus of the present preferred embodiment is characterized in that the signal pattern recognition apparatus thereof comprises the parameter training controller 20 which sets a feature transformation parameter of the feature converter and a discriminant function parameter of the discriminant function calculator provided for respective classes by training through adaptation so that the class feature is recognized according to the feature of the corresponding class, or an error probability of the signal pattern recognition is minimized.

The microphone 200 converts an inputted speech into an audio analog signal, and outputs the audio analog signal to the feature extraction section 201. Then, the feature extraction section 201 converts the inputted audio analog signal into audio digital data by subjecting the inputted audio analog signal to an analog to digital conversion process at a predetermined sampling frequency and in a predetermined number of quantization bits. Thereafter, the feature extraction section 201 executes, for example, a linear prediction analysis (LPC) on the inputted audio digital data obtained through the conversion, thereby extracting vectors of feature parameters such as 32-dimensional LPC cepstrum coefficients of the speech, and outputs the extracted vectors as an inputted signal pattern x to the feature converters 10-1 through 10-K and to the parameter training controller 20. The feature converters 10-1 through 10-K have predetermined feature transformation parameters for performing a feature transformation process, wherein the parameters can be altered by the parameter training controller 20 and correspond to the discriminant function calculators 11-1 through 11-K. Each of the feature converters execute a feature transformation process for emphasizing the feature of the class corresponding to the inputted signal pattern x to transform the inputted signal pattern x into feature vectors $y_s$ (s=1, 2, ..., K), and then outputs the feature vectors to the corresponding one of the discriminant function calculators 11-1 through 11-K. In the present case, the feature transformation process is to map the inputted signal pattern x in an orthogonal projection manner on a basis vector which is a class-feature axis representing a feature of a corresponding class $C_i$, and then multiplies the mapped signal pattern by a predetermined real number, thereby expanding or contracting the mapped signal pattern. With the above-mentioned operation, the inputted signal pattern x is transformed into the feature vectors $y_s$ so that the inputted signal pattern x can be evaluated in a feature metric space representing the essential class identity.

Further, the discriminant function calculators 11-1 through 11-K have predetermined discriminant functions, each of which can be altered by the parameter training controller 20 and represents a similarity measure for a predetermined class or a membership of the class, and operate to calculate a discriminant function value $g_s(y_s)$ (s=1, 2, ..., K) corresponding to the inputted feature vectors $y_s$ so as to output the discriminant function value $g_s(y_s)$ to the selector 12. The selector 12 outputs a classification result of information of a class corresponding to the discriminant function calculator (one of 11-1 through 11-K) which outputs the minimum discriminant function value among a plurality of K discriminant function value $g_s(y_s)$ inputted to the selector 12.

The parameter training controller 20 operates in the training mode to train and set the feature transformation parameters of the feature converters 10-1 through 10-K and the discriminant function parameters of the discriminant function calculators 11-1 through 11-K based on the signal pattern x inputted for the training so that the class feature is recognized according to the feature of the corresponding class, or the error probability of the signal pattern recognition is minimized. In other words, the above-mentioned parameters are subjected to an adaptation so that the signal pattern separability between classes can be increased. After the above-mentioned training mode, the recognition mode is set, and an inputted speech is inputted to the microphone 200, thereby making the feature extraction section 201, the feature converters 10-1 through 10-K, the discriminant function calculators 11-1 through 11-K, and the selector 12 operate to execute the signal pattern recognition.

It is preferred that the feature extraction section 201, a plurality of K feature converters 10-1 through 10-K, a plurality of K discriminant function calculators 11-1 through 11-K, the selector 12, and the parameter training controller 20 be implemented by an electric digital computer such as a micro computer or the like.

In other words, the present preferred embodiment discloses a discriminant function metric training method for forming a class feature metric space important for the signal pattern recognition. As a simplest metric training method, it can be considered to perform principal component analysis of a set of training samples every class, assume that the eigenvector (or the characteristic vector) representing an axis giving a higher-order principal component exhibits a more strict correspondence to the variation factor in respective classes, and use an axis corresponding to the lower-order principal component as a coordinate axis for representing the class feature. When a discriminant function is a quadric discriminant function, the discriminant function obtained by the present training method is substantially equal to Gaussian discriminant function or Mahalanobis distance. The training method is effective as a means for smartly expressing a variation factor of a given set of the training samples. However, the training in each class is performed independently of the other classes, and an adjustment at an end portion of a sample distribution which may incur a recognition error, i.e., around the class boundary is insufficient. For the above-mentioned reasons, there is no guarantee for assuring obtainment of a metric for presenting an optimum discrimination. Therefore, according to the preferred embodiment of the present invention, a method for introducing a training based on a discrimination result and discriminatively training a metric concerning each class is utilized. Concretely, a Minimum Classification Error/ Generalized Probabilistic Descent method is utilized as a training method. Hereinafter, the metric training method according to the minimum error training is referred to as a Discriminative Metric Design method.

(2) Overview of Statistical signal pattern recognition and Role of Metric

(2-1) Signal pattern recognition according to Bayes decision rule

In the present case, a theme for classifying a natural number d-dimensional inputted signal pattern $x \in R^d$ into a plurality of K classes $\{C_s\}_{s=1}^K$. For instance, in the case of speech recognition, the class $C_s$ corresponds to a linguistic category such as a phoneme, a word or the like. In a character recognition apparatus, the class $C_s$ is each character. In an image recognition apparatus, the class $C_s$ is a predetermined image signal pattern. The character or the image signal pattern is represented, for example, in a form of a dot image data. On the other hand, the inputted signal pattern x corresponds to a feature parameter such as a short-time power spectrum and an LPC coefficient obtained by taking an objective portion out of, for example, a continuous speech signal waveform or extracting a feature of the waveform taken out. A recognition decision rule C(x) is defined as a mapping from an inputted signal pattern space $R^d$ to the class space $\{C_s\}_{s=1}^K$ which is the feature metric space of the class $C_s$, the map expressed by the following Equation (1).

$$C(x): R^d \to \{C_s\}_{s=1}^K \quad (1)$$

Figure 3:
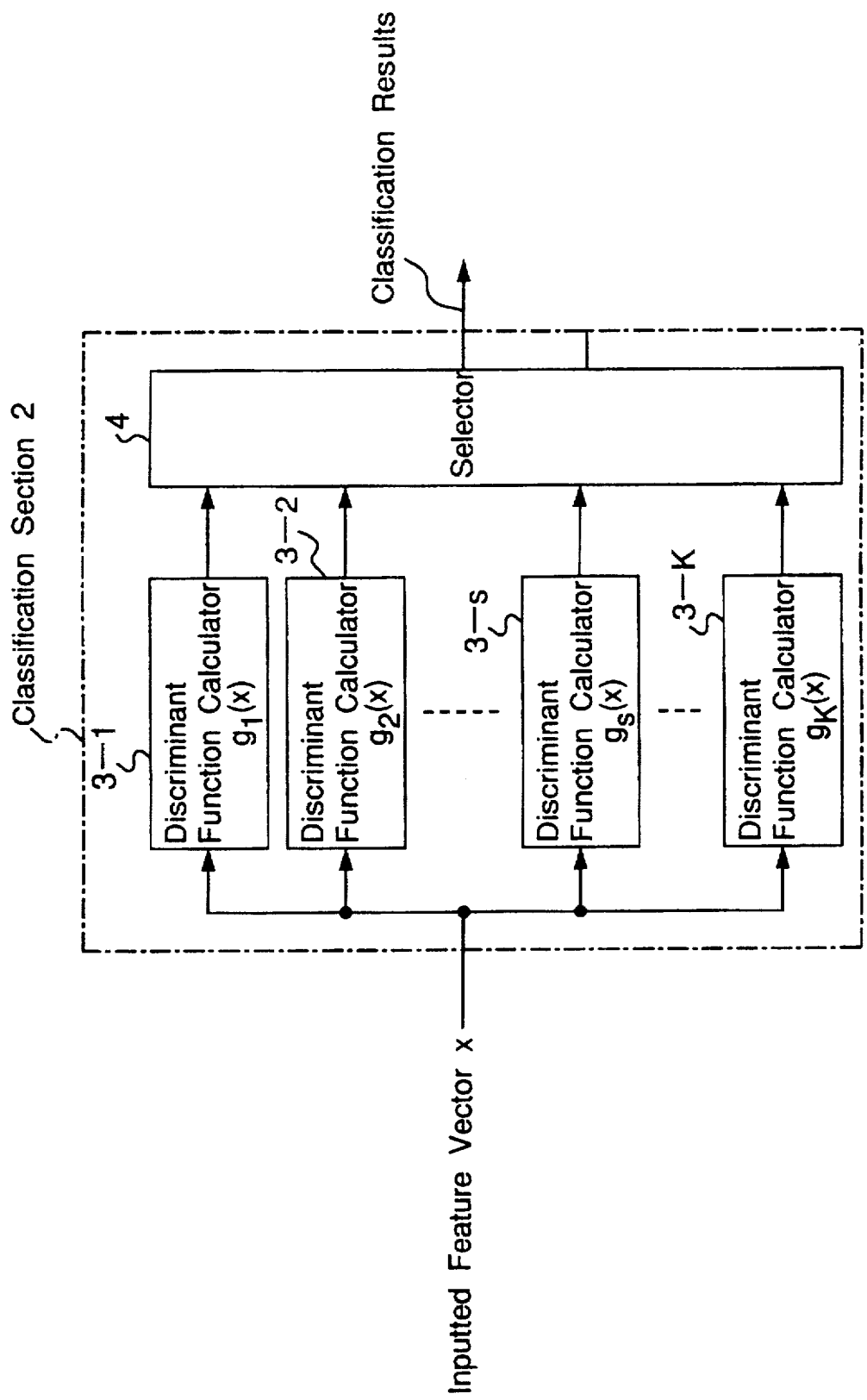
FIG. 3 is a block diagram of a classification section 2 as shown in FIG. 2.

As shown in FIG. 3, the recognition decision rule C(x) has been conventionally regarded as a process for classifying a feature value on the assumption that x is a feature value which has already undergone a feature extraction process. However, in the present preferred embodiment, there are considered:

(a) the above-mentioned generic case, and
(b) a case where both a process for extracting the feature value from the inputted signal pattern x and a process for classifying the feature value are included on the assumption that the inputted signal pattern x is regarded an observed value.

It is herein assumed that a loss in such a case where an inputted signal pattern x belonging to the class $C_k$ is recognized is $l_k(C(x))$. The loss $l_k(C(x))$ satisfies the following Equation (2).

$$l_k(C(x))=0 \text{ for } C(x)=C_k$$
$$l_k(C(x))>>0 \text{ for } C(x) \neq C_k \quad (2)$$

The loss $l_k(C(x))$ is set so as to reflect a risk of an action based on a recognition result of the signal pattern recognition apparatus. In the present preferred embodiment, the purpose of training is to minimize the recognition error probability. Therefore, a loss in a case of a correct recognition is determined to be zero, and a loss in a case of an erroneous recognition is determined to be 1. There is utilized a 0-1 loss which is expressed by the following Equation (3).

$$l_k(C(x))=0 \text{ for } C(x)=C_k$$
$$l_k(C(x))=1 \text{ for } C(x) \neq C_k \quad (3)$$

Loss with respect to all the signal patterns, i.e., expected losses which are expected values of loss are given by the following Equation (4).

$$L(C(x)) = \sum_{k=1}^{K} \int l_k(C(x)) p(x, C_k) dx \quad (4)$$

In the above-mentioned Equation (4), $p(x, C_k)$ represents a joint probability density between the inputted signal pattern x and the class $C_k$. In particular, when the loss $l_k$ is a 0-1 loss expressed by the Equation (3), the expected loss $L(C(x))$ corresponds to the recognition error probability.

According to the statistical signal pattern recognition based on Bayes decision rule, a signal pattern recognition apparatus which has a decision rule C(x) where the expected loss $L(C(x))$ is minimized is considered to be most preferable (See, for example, the Reference Document 2, or R. O. Duda and P. E. Hart, "Pattern Classification and Scene Analysis", New York: John, Wiley & Sons, 1973 (referred to as a Reference Document 7 hereinafter)). In more detail, by obtaining the decision rule C(x) where the expected loss $L(C(x))$ is minimized by means of a set of training samples, the signal pattern recognition apparatus is trained. However, since the number of the training samples are limited to a finite value even if a lot of training samples are prepared, it is extremely difficult to perform a really optimum training of the signal pattern recognition apparatus. Therefore, a practical training problem of the signal pattern recognition apparatus is a problem for obtaining a decision rule C(x) where the expected loss $L(C(x))$ is minimized with respect to all the signal patterns as far as possible by means of a finite value of a training signal pattern $\{x_n; n=1, 2, \ldots, N\}$. A concrete training method of the signal pattern recognition apparatus based on the Bayes decision rule is divided broadly into two categories of the maximum a posteriori probability decision method (Bayes method) and the discriminant function method as follows.

(2-1-1) Maximum a posteriori probability decision method (Bayes method)

The expected loss of the Equation (4) can be rewritten by the following Equation (5).

$$L(C(x)) = \int \left\{ \sum_{k=1}^{K} l_k(C(x)) Pr(C_k|x) \right\} p(x) dx \quad (5)$$

In the above-mentioned Equation (5), $Pr(C_k|x)$ represents an a posteriori probability of the class $C_k$ on condition that the signal pattern x is given, and p(x) represents an appearance probability density function of the signal pattern x. As is evident from the above-mentioned Equation (5), it can be understood that, when the signal pattern x is given, a decision rule for making the signal pattern x correspond to the class C(x) where the portion inside the braces { } is minimized minimizes $L(C(x))$. In more detail, the decision rule C(x) where the expected loss is minimized is given by the following Equation (6).

$$C(x): x \to C_i \text{ if } i = \arg\min_{s} \sum_{k=1}^{K} l_k(C_s) Pr(C_k|x) \quad (6)$$

In the above-mentioned Equation (6), arg min of the right side represents the value of s when the value positioned on the right side thereof is minimized. The decision rule according to the above-mentioned Equation (6) is referred to as a Bayes decision rule (See, for example, the Reference Document 2 and the Reference Document 7). In particular, in the case of the 0-1 loss given by the Equation (3), the Equation (6) results in the following Equation (7).

$$C(x): x \to C_i \text{ if } i = \arg\max_{s} Pr(C_s|x) \quad (7)$$

In the above-mentioned Equation (7), the arg max of the right side represents the value of s when the value positioned on the right side thereof is maximized. In other words, there is achieved a signal pattern recognition apparatus in which the decision rule for assigning the inputted signal pattern x to a class $C_i$ for providing the maximum a posteriori probability has the minimum error probability. The above-mentioned rule is particularly referred to as the maximum a posteriori probability decision rule. According to the Bayes decision rule, the decision rule according to the Equation (7) is equivalent to the following Equation (8).

$$C(x){:}x{\rightarrow}C_i \text{ if } i = \arg \max_s Pr(C_s)p(x|C_s) \qquad (8)$$

In the above-mentioned Equation (8), $Pr(C_s)$ represents an a priori probability of the class $C_s$, and $p(x|C_s)$ represents a conditional probability density function of the signal pattern x in the class $C_s$. As described above, the Bayes decision rule is to perform classification by means of a discriminant function composed of the a priori probability of each class and the conditional probability density function of the signal pattern in respective classes.

The above-mentioned decision rule can achieve the recognition with the minimum error probability only when the correct a priori probability and the correct conditional probability density function are given. However, it is practically difficult or almost impossible to obtain the true values. Therefore, a means for estimating from a limited number of training samples the probability density of them is utilized. The above-mentioned means is the principle of training of the maximum a posteriori probability decision method (Bayes method). Assuming that a training sample set whose class has been known is given, the a priori probability $Pr(C_s)$ and the conditional probability density function $p(x|C_s)$ of each class $C_s$ are estimated based on a probability model $Pr(C_s|\eta_s)$ and $p(x|C_s, \lambda_s)$ thereof. In the present case, $\eta_s$ and $\lambda_s$ are estimated parameters of the a priori probability model and the conditional probability density function model, respectively. Eventually, according to the Bayes method, the signal pattern recognition apparatus is trained by preparatorily designating functions of the a priori probability model and the conditional probability density function model which are probability models and estimating unknown parameters of the models by means of training samples, and then, recognition of an unknown inputted signal pattern is executed according to the following Equation (9).

$$C(x){:}x{\rightarrow}C_i \text{ if } i = \arg \max_s Pr(C_s|\eta_s)p(x|C_s, \lambda_s) \qquad (9)$$

For fitting of each model, a statistic estimation method such as the maximum likelihood method (See, for example, the Reference Document 7, and a joint work by Yoshiyuki Sakamoto, Makio Ishiguro, and Genshirou Kitagawa, "Information Statistics", Lecture on information science A. 5. 4. Kyouritsu Shuppan, 1983 (referred to as a Reference Document 8 hereinafter)) is generally adopted.

However, the above-mentioned classification method has two big problems. One problem is the fact that decision of a function of an optimum probability model is difficult. There can be considered a single Gaussian distribution as the simplest model, however, the distribution of an actual inputted signal pattern is more complicated. Therefore, a mixture Gaussian distribution for expressing a complicated distribution by giving a plurality of average vectors (i.e., so-called templates) to each class and combining a plurality of Gaussian distributions is often used (See, for example, the Reference Document 5). However, when the number of mixture is increased to express the complicated distribution, the number of parameters to be estimated at the same time is increased, and the model represents the limited number of training samples excessively faithfully, resulting in incurring such a problem that a discrimination capability to the unknown samples deteriorates. The above-mentioned phenomenon is referred to as an over-training. Therefore, as a means for reducing the number of parameters while setting the number of templates at an appropriate value, there is often taken a heuristic method for designating a diagonal covariance matrix or a method for applying an information criterion (See, for example, the Reference Document 8). However, the estimation accuracy of the probability distribution extremely deteriorates, and therefore, the achievement of the minimum error recognition becomes more difficult. The other problem is an inconsistency of the estimation accuracy of the probability distribution with the recognition error probability. Since the number of training samples is limited to a finite value, the estimated probability distribution is almost always accompanied by an error with respect to the true distribution. It is considered that the erroneous recognition occurs substantially in the vicinity of the class boundary. The Bayes method tends to faithfully represent the model in a portion on which the training samples concentrate apart from the class boundary, and therefore, an accumulation of errors may possibly concentrate on and around the class boundary. In other words, it can not be said that an improvement of the estimation accuracy of the probability distribution provides a direct contribution to the minimization of the error probability. Therefore, in the preferred embodiment of the present invention, the maximum a posteriori probability decision method (Bayes method) is not used, and the following discriminant function method is used instead of this method.

(2-1-2) Discriminant function method

The discriminant function method is a method for training the signal pattern recognition apparatus by setting a discriminant function which is a measure representing a membership of an inputted signal pattern to each class and training the discriminant function so that a loss brought by the recognition result of training samples is minimized. In comparison with the above-mentioned Bayes method, the discriminant function method can be regarded as a training method intended directly to minimize the loss or the recognition error probability. According to the discriminant function method, the following Equations (10) and (11) are given as a decision rule.

$$C(x){:}x{\rightarrow}C_i \text{ if } i = \arg \max_s g_s(x) \qquad (10)$$

$$C(x){:}x{\rightarrow}C_i \text{ if } i = \arg \min_s g_s(x) \qquad (11)$$

In other words, the decision rule $C(x)$ is expressed by a function set $g(x)=\{g_s(x)\}_{s=1}^K$. In the present case, $g_s(x)$ is referred to as a discriminant function, and represents the membership of the inputted signal pattern x to the class $C_s$. The above-mentioned Equation (10) is a decision rule for making the signal pattern x correspond to the class representing the maximum discriminant function value. As a discriminant function, a probability model for expressing a similarity and such a case where two vector angles are adopted can be enumerated as examples. On the other hand, the above-mentioned Equation (11) is a decision rule for assigning the signal pattern x to the class representing the minimum value of the discriminant function of the signal pattern x. A case where a distance from a class reference vector is applied as a discriminant function is an example of the above-mentioned rule. In other words, in contrast to the Bayes method limited to the probability model, a function in a wider range can be designated according to the discriminant function method.

The training of the signal pattern recognition apparatus is performed by training a discriminant function set g(x) such that the expected loss L(Cx)) is reduced as far as possible by means of a set of training samples $\{x_n; n=1, 2, \ldots, N\}$ whose classes have been known. It is to be noted that the functional minimization problem can be hardly solved directly. Therefore, the training is performed by normally setting a shape $g_s(x; \Theta)$ and estimating the parameter $\Theta$. According to the training of the signal pattern recognition apparatus based on the discriminant function method, formalization of a loss function $l_k(x; \Theta)=l_k(g((x; \Theta))$ and a minimization method of the expected loss of the objective function are important problems. A basic method of the Minimum Classification Error/Generalized Probabilistic Descent method is disclosed in, for example, B. H. Juang and S. Katagiri, "Discriminative learning for minimum error classification", IEEE Transaction on Signal Processing, Vol. 40, No. 12, pp. 3043–3054, in December, 1992 (referred to as a Reference Document 6 hereinafter). The Minimum Classification Error/Generalized Probabilistic Descent method is a signal pattern recognition apparatus training method which realizes a formalization of the decision rule C(x) and the loss function $l_k(x; \Theta)$ according to a smooth first-order differentiable function, and enables a practical application of a minimization method such as a gradient method.

Intuitively speaking, the training according to the discriminant function method is performed by correcting a discriminant function so that the possible occurrence of the recognition error is suppressed as far as possible. The above-mentioned architecture means that an increase of accuracy at the class boundary where the erroneous recognition tends to occur. It can be understood that the discriminant function method performs a training of an essential portion for the increase of the recognition accuracy in contrast to the Bayes method which is based on the fitting of a stochastic model. Therefore, in the present preferred embodiment of the present invention, the training of the signal pattern recognition apparatus is performed according to the discriminant function method.

However, even according to the discriminant function method, the problem of the reduction of the accuracy in recognizing an unknown sample different from the training sample is serious. For instance, when the number of templates which are class reference vectors is increased in order to express the variation of signal patterns in a class according to a classification method based on a distance measure represented by a multi-template distance classifier (LVQ: See, for example, the Reference Document 4), the problem of over-training about the training sample occurs in a manner similar to that of the case of the mixture Gaussian function according to the Bayes method. Normally, the number of templates (or the degree of freedom of the parameter) is heuristically determined, however, such an architecture does not lead to a rational achievement of the increase of the accuracy in recognizing the unknown sample though it contributes to reduction of a difference in recognition accuracy between the training sample and the unknown sample.

(2-2) Role of discriminant function metric

In a statistical signal pattern recognition, the increase of the accuracy in recognizing the unknown sample different from the training sample is an essentially important problem. The above-mentioned matter is the most important problem in an actual environment which tends to include a variation unnecessary for the recognition in a case of, for example, a speaker-independent speech recognition and a noisy speech recognition. According to either the above-mentioned Bayes method or the discriminant function method, a popular means for preventing the deterioration of the accuracy in recognizing the unknown sample is to sacrifice the accuracy in recognizing the training sample. However, such an architecture does not lead to a rational achievement of the increase of the accuracy in recognizing the unknown sample for the reason as described hereinbefore.

Figure 4:
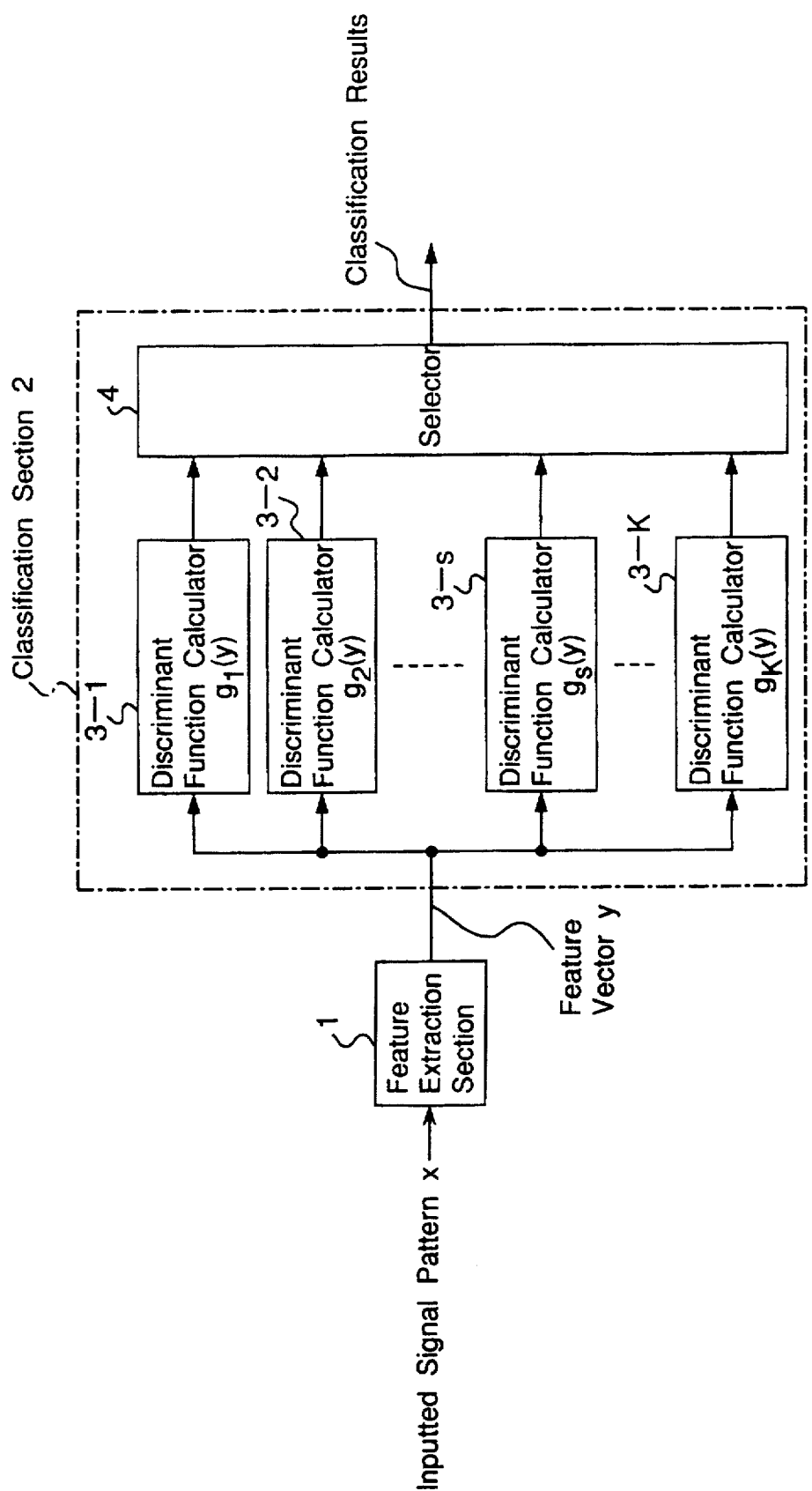
FIG. 4 is a conventional signal pattern recognition apparatus using a conventional classification section 2 shown in FIG. 3.

For the purpose of training the signal pattern recognition apparatus independently of the difference between samples with high accuracy, it can be considered proper to learn some attributes for efficiently expressing the class feature from the limited number of training samples. Here is considered the training of the feature metric space having small variations in all the classes. Referring to FIG. 4 which shows a conventional apparatus, a feature metric space is given commonly to all the classes. However, it is considered difficult to obtain a common feature metric space having small variations in all the classes. In view of the above, according to the present preferred embodiment, a feature metric space for smartly expressing the class identity is provided in each of the classes in a manner as shown in FIG. 1 in contrast to the conventional apparatus shown in FIG. 4 in which the similarity evaluation is performed in a feature metric space common to all the classes. The above-mentioned arrangement of the present preferred embodiment can be comprehended as a matter of training the "metric" of the discriminant function inherent in each of the classes so as to perform the similarity evaluation in a feature metric space inherent in each of the classes.

Figure 5A:
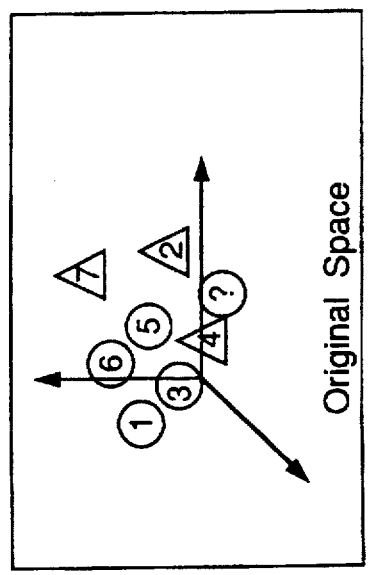
FIG. 5A is an explanatory view of examples of signal patterns in an original space which are handled in the signal pattern recognition apparatus of the preferred embodiment shown in FIG. 1.
Figure 5B:
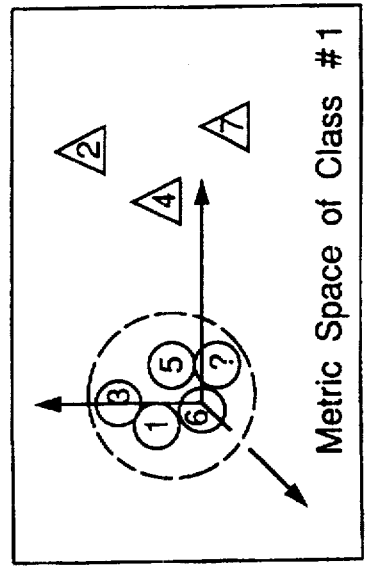
FIG. 5B is an explanatory view of examples of signal patterns in a metric space of class #1 when the original space shown in FIG. 5A is transformed into two feature metric spaces #1 and #2 in the signal pattern recognition apparatus of the preferred embodiment shown in FIG. 1.
Figure 5C:
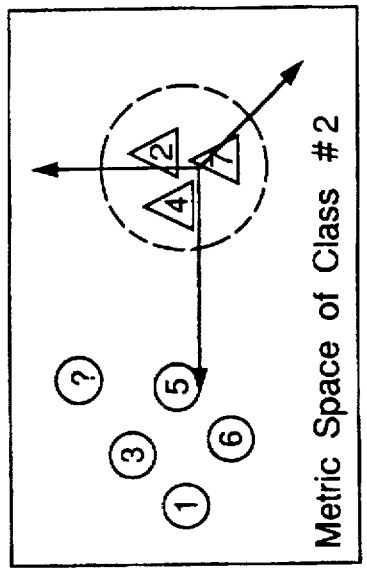
FIG. 5C is an explanatory view of examples of signal patterns in a metric space of class #2 when the original space shown in FIG. 5A is transformed into two feature metric spaces #1 and #2 in the signal pattern recognition apparatus of the preferred embodiment shown in FIG. 1.

When the above-mentioned training can be achieved, any unessential variation can be suppressed by the signal pattern recognition in evaluating the similarity between the unknown sample and each class, and the similarity evaluation can be performed in a feature metric space such that it effectively expresses the class identity in a manner as shown in FIG. 5. In other words, in the original space, the signal pattern of Class #1 and the signal pattern of Class #2 exist randomly. In the feature metric space of Class #1, the signal pattern belonging to Class #1 is positioned in a location within a predetermined range to allow the similarity evaluation of Class #1 to be easily achieved. On the other hand, in the feature metric space of Class #2, the signal pattern belonging to Class #2 is positioned in a location within a predetermined range to allow the similarity evaluation of Class #2 to be easily achieved. A mathematical definition and a training method of the "metric" will be described below.

(3) Training of Metric (3-1) Formalization of Metric

First of all, a linear transformation $L_{is}$ from an original signal pattern space X to a feature metric space $Y_s$ of a class $C_s$ is defined by the following Equation (12). The linear transformation is executed in the feature converters 10-1 through 10-K shown in FIG. 1.

$$y_s = L_{is}(x) = \Phi_s V_s^T x, \quad s=1, 2, \ldots, K \tag{12}$$

$$\Phi_s = \text{diag}(\phi_{s,1} \phi_{s,2} \cdots \phi_{s,d}) \tag{13}$$

$$V_s = [v_{s,1} \, v_{s,2} \, \cdots \, v_{s,d}], \text{ where } v_s^T v_s = I \tag{14}$$

Figure 6:
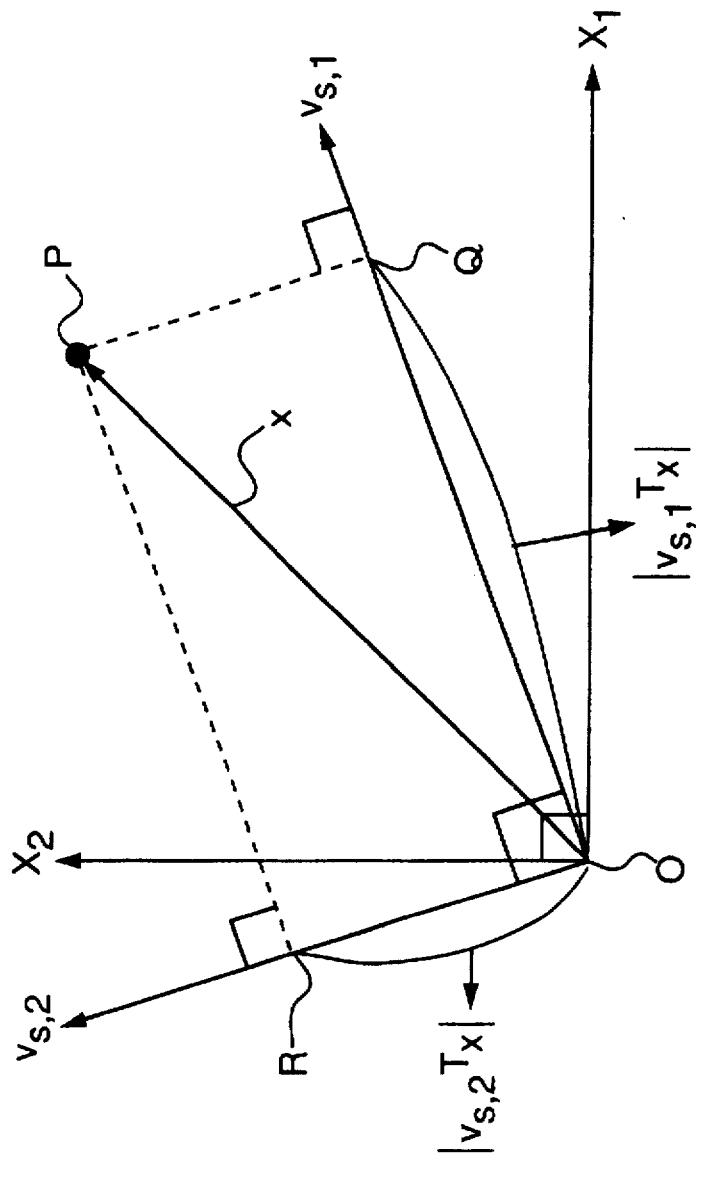
FIG. 6 is a schematic view showing an operation of feature converters 10-1 through 10-K which are shown in FIG. 1.

In the above-mentioned Equations (12), (13) and (14), the superscript T represents a transposition of a matrix, the diag(.) represents a diagonal matrix, and I represents an identity matrix or a unit matrix. A role of the transformation of the above-mentioned Equations can be easily understood from FIG. 6 in a case of two dimensions (d=2). Each column vector of an orthogonal matrix $v_s$ is an orthogonal base vector of a d-dimensional vector space. An i-th component of the transformed vector $y_s$ is obtained by orthogonally projecting an inputted signal pattern x in a direction of an i-th basis vector $v_{s,i}$, and further multiplying the resulting vector by a real number $\phi_{s,i}$ to effect expansion or contraction (i.e., weighting), though not shown in FIG. 6. Hereinafter, the vector $v_{s,i}$ and the real number $\phi_{s,i}$ are referred to as an i-th class-feature axis and a weighting parameter in the class $C_s$, respectively. In the example shown in FIG. 6, the original signal pattern space X is represented by two axes $X_1$ and $X_2$ which are perpendicular to each other, where the inputted signal pattern x expressed by OP is transformed into a feature metric space after the linear transformation composed of two basis vectors $v_{s,1}$ and $v_{s,2}$ which are perpendicular to each other. A component OQ transformed into the base vector $v_{s,1}$ is expressed as $|v_{s,1}^T x|$, while a component OR transformed into the base vector $v_{s,2}$ is expressed as $|v_{s,2}^T x|$.

The class-feature axis and the weighting parameter can be independently trained in respective classes. Furthermore, a component on each axis corresponding to a weighting parameter having a small absolute value is reflected less on the similarity evaluation. Therefore, by making the axis representing the variation unessential for the signal pattern recognition correspond to the class-feature axis containing the weighting parameter having the small value in each class, an evaluation laying stress on the feature metric space representing the essential class identity is achieved. In other words, the similarity evaluation is performed within the feature metric space inherent in each class, thereby allowing the suppression of the variation of similarity evaluation due to a difference between samples.

Each of a space $\{v_{s,i}\}_{i=1}^d$ and a space $\{\phi_{s,i}\}_{i=1}^d$ provides a "measurement method" of the similarity in the class $C_s$. Therefore, each of the spaces are referred to as a "metric", and the space $Y_s$ in which the feature vector $y_s$ moves is referred to as a "feature metric space of the class $C_s$". The training method for the signal pattern recognition apparatus training method of the present preferred embodiment also trains the metric at the same time together with each training parameter of the classification section 2 adopted generally. In other words, according to the present preferred embodiment, both of the feature converters 10-1 through 10-K and the discriminant function calculators 11-1 through 11-K are trained.

(3-2) Discriminant function to be handled

As a similarity measure in the feature metric space in each class, generally a variety of measures are applicable. In other words, the similarity measure selection and the metric training can be considered to be performed independently of each other. As the simplest measure having the highest general-use, the Euclidean distance measure can be enumerated. When seeing the Euclidean distance measure from the original signal pattern space X, a discriminant function corresponding to an s-th class $C_s$ (s=1, 2, . . . , K) is given by a quadric discriminant function expressed by the following Equation (15).

$$\begin{aligned} g_s(x;\Theta) &= g(x;\Theta_s) \\ &= \|Lis(x) - Lis(r_s)\|^2 + \sum_{i=1}^{d} \log(\epsilon + \delta\phi_{s,i}^2) \\ &= (x-r_s)^T A_s(x-r_s) + \log det(\epsilon I + \delta A_s^{-1}) \end{aligned} \quad (15)$$

where $$A_s = V_s \Lambda_s V_s^T \quad (16)$$

$$\Lambda_s = \Phi_s^2 \quad (17)$$

$$r_s = [r_{s,1}\ r_{s,2}\ \cdots\ r_{s,d}]^T \quad (18)$$

$$\Theta = \{\Theta_1, \Theta_2, \ldots, \Theta_k\} \quad (19)$$

$$\Theta_s = \{r_s, \Phi_s, V_s\} \quad (20)$$

In the Equation (15), $\|.\|^2$ of the right member of the second equation represents the square of an Euclidean norm of a vector, "det" represents a determinant, and $r_s$ represents a reference vector of the class $C_s$. The parameter $\Theta_s$ of the signal pattern recognition apparatus concerning the class $C_s$ is the class reference vector $r_s$ and the metric ($\Phi_s$, $V_s$), while $\epsilon$ and $\delta$ are previously determined non-negative constants. The constant $\epsilon$ is a constant for preventing the discriminant function from being negative. In other words, when $\epsilon \geq 1$, the discriminant function is always non-negative. On the other hand, $\delta A_s$ is a constraint term for preventing the matrix $A_s$ from becoming a zero matrix in the training. When the average vector and inverse of the covariance matrix in the class $C_s$ are adopted as $r_s$ and $A_s$, respectively, the discriminant function corresponds to the Mahalanobis distance when $\epsilon=1$ and $\delta=0$. When $\epsilon=0$ and $\delta=1$, the discriminant function becomes the Gaussian discriminant function. In other words, the discriminant function according to the Equation (15) is the basis of a generally adopted discriminant function. In the present case, the above-mentioned quadric discriminant function classifier is used as a preferred classifier.

(3-3) Training of Metric according to principal component analysis

As the simplest metric training method, there can be considered a method for performing in each class a principal component analysis of a set of training samples belonging to an identical class. The principal component analysis is a data analysis method for searching an orthogonal axis for maximizing a variance of components from a multi-variate data set (See, for example, the Reference Documents 1 and 2). With the above-mentioned method, a principal component direction of the variation factor in each class can be extracted. First of all, a class sample mean $\mu_s$ and a class sample covariance matrix $R_s$ in the class $C_s$ are expressed by the following Equations (21) and (22).

$$\mu_s = \frac{1}{N_s} \sum_{n=1}^{N_s} x_n^{(s)}, \quad (21)$$

$$R_s = \frac{1}{N_s} \sum_{n=1}^{N_s} (x_n^{(s)} - \mu_s)(x_n^{(s)} - \mu_s)^T \quad (22)$$

In the above Equations (21) and (22), $x_n^{(s)}$ represents training samples belonging to the class $C_s$, while $N_s$ represents the number of the training samples. Further, the class sample covariance matrix $R_s$ is subjected to eigen-decomposition by means of the following Equation (23).

$$R_s = E_s \Gamma_s E_s^T \quad (23)$$

$$\Gamma_s = diag(\gamma_{s,1}\ \gamma_{s,2}\ \cdots\ \gamma_{s,d}) \quad (24)$$

$$E_s = [e_{s,1}\ e_{s,2}\ \cdots\ e_{s,d}], \text{ where } E_s^T E_s = I \quad (25)$$

The principal component axis can be given by the eigenvector $\{e_{s,i}\}_{i=1}^d$ of the class sample covariance matrix $R_s$. An eigen-value $\{\gamma_{s,i}\}_{i=1}^d$ corresponding to each eigenvector is equal to a sample variance of the entry obtained by orthogonally projecting a sample in a direction of the eigenvector. Therefore, the eigenvector corresponding to the great eigen-value of a class sample covariance matrix in each class can be regarded as the axis representing the dispersion of samples in the class. In the present case, the metric ($\Phi_s$, $V_s$) can be expressed by the following Equations (26) and (27).

$$\Phi_s = \Gamma_s^{-\frac{1}{2}} \qquad (26)$$

$$V_s = E_s \qquad (27)$$

According to the above-mentioned Equation (26), the square root of an inverse number of the eigen-value of the covariance matrix is designated as the weighting parameter, resulting in regarding the eigenvector of the lower-order principal component as the basis axis for representing the class feature. As a result, when the class sample mean $\mu_s$ is taken as a center vector $r_s$ and the distance measure in the feature metric space is the Euclidean distance, the quadric discriminant function based on the principal component analysis is substantially equal to the conventional Gaussian discriminant function or the conventional Mahalanobis distance. In other words, the Gaussian discriminant function can be regarded as the quadric discriminant function in such a case where the metric of each class is obtained from a class-dependent statistical analysis of the training samples.

(3-4) Training of Discriminative metric based on Minimum error recognition

The principal component analysis method is a statistically high accuracy method as an information compression method of an inputted signal pattern. However, training the parameters in each class is performed independently of the other classes, and therefore, the metric tends to be faithfully trained in the portions where the training samples are concentrated. Since an adjustment at an end portion of the sample distribution where substantially the erroneous recognition tends to occur, i.e., in the vicinity of the class boundary is insufficient, there is no guarantee for obtaining a metric for giving an optimum discrimination to an unknown sample. Therefore, the training method based on the above-mentioned discriminant function method, i.e., the method for discriminately training the metric concerning each class is adopted. In the present case, a training according to the Minimum Classification Error/Generalized Probabilistic Descent method is performed. For simplicity, the above-mentioned training method is referred to as a Discriminative Metric Design.

(3-4-1) Overview of Discriminative Metric Design

As described above, the discriminant function method is to perform training of a signal pattern recognition apparatus intended directly to minimize the expected loss of the signal pattern recognition apparatus, i.e., the recognition error probability. According to the present training method, formalization of a loss function $l_k(x;\Theta)$ and the method for minimizing the expected loss which is the objective function are important problems. The loss function is desired to smartly reflect the risk of an action based on the classification result of each classifier. In particular, when the training of the minimum error signal pattern recognition apparatus is the purpose or goal of the training, the 0-1 loss given by the Equation (3) is consistent in correspondence with the recognition error probability. However, the objective function based on the 0-1 loss is unsmooth concerning the training parameter $\Theta$, i.e., not first-order differentiable. Therefore, a gradient method which is an efficient optimizing method can not be applied, and it means that the loss function is inappropriate in a practical point of view. Therefore, as a loss function which can be more analytically handled, a Perceptron loss and a squared error loss are often adopted (See, for example, the Reference Document 7). Each of the above-mentioned losses has such an advantageous effect that the gradient method can be applied because the objective function is differentiable. However, the losses have no consistency with the minimization of the recognition error probability, and therefore, they are insufficient in terms of an optimum training of the signal pattern recognition apparatus.

A method for concurrently solving the above-mentioned two problems, i.e., the unsmoothness of the objective function and the inconsistency with the minimization of the recognition error probability is the Minimum Classification Error/Generalized Probabilistic Descent method. The Minimum Classification Error/Generalized Probabilistic Descent method can achieve the formalization of the smooth loss function having a consistency with the minimization of the recognition error probability through two steps of formalization as follows. Here is now considered the classification of an inputted signal pattern x belonging to a class $C_k$. First of all, a measure representing the correctness or incorrectness of classification decision, i.e., a misclassification measure $d_k(x;\Theta)$ is defined. In the present case, an Lp norm type measure as described below is adopted. In more detail, in the case of the maximum discriminant function decision rule of the Equation (10), the misclassification measure $d_k(x;\Theta)$ is defined by the following Equation (28). On the other hand, in the case of the minimum discriminant function decision rule, the misclassification measure $d_k(x;\Theta)$ is defined by the following Equation (29).

$$d_k(x;\Theta) = -1 + \left[ \frac{1}{K-1} \sum_{j, j \neq k} \left\{ \frac{g_j(x;\Theta)}{g_k(x;\Theta)} \right\}^\eta \right]^{\frac{1}{\eta}}, \eta > 0 \qquad (28)$$

$$d_k(x;\Theta) = 1 - \left[ \frac{1}{K-1} \sum_{j, j \neq k} \left\{ \frac{g_j(x;\Theta)}{g_k(x;\Theta)} \right\}^{-\eta} \right]^{-\frac{1}{\eta}}, \eta > 0 \qquad (29)$$

In each of the above-mentioned cases, when a training constant $\eta$ is sufficiently greater than one, the misclassification measure $d_k(x;\Theta) \leq 0$ corresponds to a correct classification, while the misclassification measure $d_k(x;\Theta) > 0$ corresponds to an incorrect classification. In other words, the misclassification measure expresses a class decision rule in a form of a function, and is smooth concerning the parameter $\Theta$ and first-order differentiable. Then, a smooth 0-1 loss is defined such that it simulates the 0-1 loss of the Equation (3). The 0-1 loss can be formalized in a variety of forms, and a sigmoid function defined by the following Equation (30) is adopted in the present case.

$$\begin{aligned} l_k(x;\Theta) &= l_k(d_k(x;\Theta)) \\ &= 1/(1 + \exp\{-\alpha(d_k(x;\Theta) - \beta)\}), \alpha > 0 \end{aligned} \qquad (30)$$

The loss function takes a value of zero when the misclassification measure $d_k(x;\Theta) \leq 0$ with respect to a sufficiently great constant $\alpha$ and a constant $\beta$ having a sufficiently small absolute value, i.e., in the case of the correct classification, or takes a value sufficiently close to one when the misclassification measure $d_k(x;\Theta) > 0$, i.e., in the case of the incorrect classification. Therefore, it can be understood that the loss function is a satisfactory approximation of the 0-1 loss function, and consequently, the objective function is a sufficient approximation of the recognition error probability. Furthermore, the loss function is smooth concerning the misclassification measure $d_k$ and first-order differentiable, and therefore, the loss function is smooth also concerning the parameter $\Theta$ and first-order differentiable. By changing the constant $\alpha$, the approximation to the recognition error probability and the smoothness can be adjusted.

Here is now considered the minimization problem of the objective function formed of the loss function formalized in the above-mentioned manner. The minimization method can be divided broadly into two categories. As one method, there can be considered a method for effecting the minimization of an empirical average loss of the following Equation (31) on all ones of a set $\{x_n; n=1, 2, \ldots, N\}$ of obtainable training samples according to the gradient method such as a steepest descent method in a batch processing manner.

$$L_0(\Theta) = \frac{1}{N} \sum_{n=1}^{N} \left\{ \sum_{k=1}^{K} l_k(x_n; \Theta) 1(x_n \in C_k) \right\} \quad (31)$$

$$\text{where } 1(A) = \begin{cases} 1, \text{ if } A \text{ is true} \\ 0, \text{ if } A \text{ is false} \end{cases}$$

In the above Equation (31), 1(.) represents a function which takes a function value of one or zero.

Another minimization method is an adaptive processing method for randomly extracting one sample whose class has been known out of the set of the training samples, and adjusting the parameter Θ so that a loss concerning the sample is reduced. So long as a given finite set of the training samples is used, the difference between the two methods is small. However, the latter adaptive adjustment mechanism has such a remarkable potential that it can make the classifier adapt to a new use condition which can not be handled in the training stage. According to the Minimum Classification Error/Generalized Probabilistic Descent method used in the present preferred embodiment of the present invention, the following adaptive minimization method is used. According to the adaptive minimization method, updating of the parameter Θ is performed according to the following Equation (32) follows at the time of a natural number t-th iteration.

$$\Theta^{(t)} = \Theta^{(t-1)} + \Delta\Theta(x_t, C_t, \Theta^{(t-1)}) \quad (32)$$

In the above Equation (32), the parameter $\Theta^{(t)}$ represents a parameter value at the time of the t-th iteration, $\Delta\Theta(.)$ represents a correction value of the parameter, and $x_t$ and $C_k$ represent respectively a training sample given randomly and a class to which the sample belongs. It is desired for the adjustment mechanism according to the updating equation to be such that the signal pattern recognition apparatus is trained so that the expected loss reduces every time a new sample is given, and to be intended to regularly minimize the expected loss. A mathematical basis of the above-mentioned requirements is given by a probabilistic descent theorem as follows.

<Probabilistic Descent Theorem>

When a given sample $x_t$ belongs to a class $C_k$, the parameter correction value ΔΘ is set according to the following Equation (33).

$$\Delta\Theta(x_t, C_k, \Theta^{(t-1)}) = -\epsilon_t H \nabla \Theta l_k(x_t; \Theta^{(t-1)}) \quad (33)$$

In the above-mentioned Equation (33), ∇Θ represents a partial differentiation depending on the parameter Θ, a correction coefficient $\epsilon_t$ represents a sufficiently small positive constant, and H represents a positive-definite matrix. In the present case, the expected loss L (Θ) reduces in average with respect to the sufficiently small value of $\epsilon_t$ in each iteration. In other words, the following Equation 34 is satisfied.

$$E\{L(\Theta^{(t)}) - L(\Theta^{(t-1)})\} \leq 0 \quad (34)$$

Furthermore, if an infinite number sequence $\{x_t; t=1, 2, \ldots\}$ extracted randomly is used for the training and $\epsilon_t$ conforms to the following Equation (35), a parameter matrix $\{\Theta^{(t)}; t=1, 2, \ldots\}$ generated in accordance with the Equations (32) and (33) converges on at least a locally minimum point Θ* of the expected loss L(Θ) with probability one.

$$\sum_{t=1}^{\infty} \epsilon_t \to \infty \quad (35)$$

$$\sum_{t=1}^{\infty} \epsilon_t^2 < \infty$$

At the beginning, the above-mentioned rule is given only in a case of a statistic-dimensional signal pattern, however, the rule has been expanded for a signal pattern whose dimension changes depending on a sample such as a speech signal pattern. With the above-mentioned arrangement, the minimization of the expected loss or the recognition error probability which is the error probability of signal pattern recognition, consistent smooth formalization of a loss function, and formalization of a practical adaptive optimization method are achieved.

(3-4-2) Unconditional Optimization

By means of a set of training samples $\{x_t; t=1, 2, \ldots, N\}$ whose classes have been known, a training parameter $\Theta_s = \{r_s, \Phi_s, V_s\}$ ($s=1, 2, \ldots, K$), i.e., the center vector and metric are trained according to the Minimum Classification Error/Generalized Probabilistic Descent method based on the quadric discriminant function given by the Equation (15). Although correction of $r_s$ and $\Phi_s$ is easy, correction of $V_s$ is difficult as it is because of such a restrictive condition that $V_s$ is an orthogonal matrix is imposed. Therefore, the orthogonal matrix $V_s$ is expressed by the following Equation (36).

$$V_s = U_{1,2}(\theta_{s,1,2}) U_{1,3}(\theta_{s,1,3}) \cdots U_{d-1,d}(\theta_{s,d-1,d}) \quad (36)$$

In the above-mentioned Equation (36), the above d × d matrix $U_{p,q}(\theta)$ (p<q) is given by the following Equation (37).

$$U_{p,q}(\theta) = \begin{bmatrix} 1 & & & & & & \\ & \ddots & & & & & \\ & & 1 & & & & \\ & & & \cos\theta & & \sin\theta & \\ & & & & 1 & & \\ & & & & & \ddots & \\ & & & -\sin\theta & & \cos\theta & \\ & & & & & & 1 \\ & & & & & & & \ddots \\ & & & & & & & & 1 \end{bmatrix} \quad (37)$$

Accordingly, the matrix $U_{p,q}(\theta)$ is a d-dimensional orthogonal matrix in which the (p, p) component and the (q, q) component represent cosθ respectively, the (p, q) component represents sinθ, the (q, p) component represents −sinθ, and the others represent a diagonal component of 1 and a non-diagonal component of 0. The matrix $U_{p,q}(\theta)$ is a so-called Jacobi Rotation which is an operator for rotating a p-axis component and a q-axis component of a d-dimensional vector in a plane generated by the axes by an angle of θ (See, for example, G. H. Golub and C. F. Van Loan, "Matrix Computations, The Johns Hopkins University Press, 1989 (referred to as a Reference Document 9 hereinafter). The above Equation (36) expresses the fact that the orthogonal matrix is expressed by the Jacobi Rotation corresponding to axis pairs of all combinations. The number of the combinations is d(d−1)/2 equal to the degree of freedom of the orthogonal matrix $V_s$, and then, it is understood that an angle $(\theta_{s,p,q})$ is required to be adjusted instead of correcting the orthogonal matrix $V_s$ itself under the restrictive condition. With the above-mentioned arrangement, the parameters to be adjusted according to the Minimum Classification Error/Generalized Probabilistic Descent method are of the following three types.

$$r_s=[r_{s,1}\ r_{s,2}\ \ldots\ r_{s,d}]^T \in R^d,\ s=1,2,\ldots,K \tag{38}$$

$$\phi_s=[\phi_{s,1}\ \phi_{s,2}\ \ldots\ \phi_{s,d}]^T \in R^d,\ S=1,2,\ldots,K \tag{39}$$

$$\theta_s=[\theta_{s,1,2}\ \theta_{s,1,3}\ \ldots\ \theta_{s,d-1,d}]^T \in R^{d(d-1)/2},\ s=1,2,\ldots,K \tag{40}$$

(3-4-3) Initialization of Discriminative Metric Design

A method of optimizing the Minimum Classification Error/Generalized Probabilistic Descent method is based on the gradient method, and therefore, the parameter matrix converges on a variety of locally-optimal solutions depending on the initial value thereof. Therefore, it is preferred to provide an initial value which is assimilated to a globally-optimum solution as close as possible. As an initial value $r_s^{(0)}$ of $r_s$, it is preferred to give a class sample mean vector $\mu_s$ in a manner similar to that of the normal distance measure. As initial values $(\Phi_s^{(0)}, V_s^{(0)})$ of metric, there can be considered a uniformly weighting and a Cartesian coordinate system $(\Phi_s^{(0)}=I, V_s^{(0)}=I)$ or values $(\Phi_s^{(0)}=\Gamma^{-1/2}, V_s^{(0)}=E_s)$ according to the above-mentioned principal component analysis. The former corresponds to the Euclidean distance, while the latter corresponds to the Gaussian discriminant function or the Mahalanobis distance. In particular, since the latter is a value obtained by the principal component analysis, the value can be considered to be a statistically satisfactory initial value. Therefore, the present preferred embodiment of the present invention uses the latter.

However, in the case of initialization by the principal component analysis, the initial setting of the parameter $\theta_s$ corresponding to the initial value $V_s^{(0)}$ $(=E_s)$ of the orthogonal matrix is difficult. Therefore, the coordinate system in the class $C_s$ is rotated by the initial value $V_s^{(0)}$.

$$g(x;\Theta_s)=(V_s^{(0)T}x-p_s)^T W_s \Phi_s^2 W_s^T(V_s^{(0)T}x-p_s)+\log\det(eI+\delta\Phi_s^{-2}) \tag{41}$$

$$P_s=V_s^{(0)T}r_s \tag{42}$$

$$W_s=V_s^{(0)T}V_s \tag{43}$$

In the above-mentioned Equations (41) through (43), $W_s$ is apparently an orthogonal matrix, and therefore, the orthogonal matrix $W_s$ is expressed by the following Equation (44) in a manner similar to that of the Equation (36).

$$W_s=U_{1,2}(\theta_{s,1,2})U_{1,3}(\theta_{s,1,3})\ldots U_{d-1,d}(\theta_{s,d-1,d}) \tag{44}$$

In this case, an initial value $W_s^{(0)}$ of the orthogonal matrix $W_s$ can be expressed by the following Equation 45.

$$W_s^{(0)}=V_s^{(0)T}V_s^{(0)}=I \tag{45}$$

Therefore, it is required to set all the initial values of the parameter $\theta_s$ to zero, respectively. With the above-mentioned arrangement, the parameter $\Theta_s$ (s=1, 2, ..., K) to be adjusted can be expressed by the following Equations (46) through (48).

$$p_s=[p_{s,1}\ p_{s,2}\ \ldots\ p_{s,d}]^T \in R^d \tag{46}$$

$$\phi_s=[\phi_{s,1}\ \phi_{s,2}\ \ldots\ \phi_{s,d}]^T \in R^d \tag{47}$$

$$\theta_s=[\theta_{s,1,2}\ \theta_{s,1,3}\ \ldots\ \theta_{s,d-1,d}]^T \in R^{d(d-1)/2} \tag{48}$$

Then initial values of them are given by the following Equations (49) through (52).

$$p_s^{(0)}=V_s^{(0)T}\mu_s \tag{49}$$

$$\phi_{s,i}^{(0)}=\frac{1}{\sqrt{\gamma_{s,i}}}, \tag{50}$$

$$\theta_{s,p,q}^{(0)}=0,\ p<q;\ p=1,2,\ldots,d-1;\ q=2,3,\ldots,d \tag{51}$$

$$V_s^{(0)}=E_s \tag{52}$$

(3-4-4) Derivation of DMD updating equation

In the Minimum Classification Error/Generalized Probabilistic Descent method, a parameter correction value when a training sample $x$, whose class of correctness is $C_k$ is given by the Equation (33). When the sigmoid function is adopted as the loss function, the gradient of the loss function is expressed by the following Equations (53) and (54) according to a chain rule.

$$\nabla\Theta l_k(x;\Theta)=(\partial l_k(d_k)/\partial d_k)\nabla\Theta d_k(x;\Theta) \tag{53}$$

$$\nabla\Theta l_k(x;\Theta)=\alpha l_k(x;\Theta)\{1-l_k(x;\Theta)\}\nabla\Theta d_k(x;\Theta) \tag{54}$$

In the above-mentioned Equations (53) and (54), $\nabla\Theta d_k(x;\Theta)$ is given by the following Equations (55) and (56).

$$\nabla\Theta d_k(x;\Theta)=[\nabla\Theta_1 d_k(x;\Theta)\ \nabla\Theta_2 d_k(x;\Theta)\ \ldots\ \nabla\Theta_K d_k(x;\Theta)] \tag{55}$$

$$\nabla\Theta_s d_k(x;\Theta)=p_{k,s}(x;\Theta)(\partial g(x;\Theta_s)/\partial\Theta_s),\ s=1,2,\ldots,K \tag{56}$$

$$p_{k,s}(x;\Theta)=\begin{cases} \frac{1}{g(x;\Theta_k)}\left\{\frac{1}{K-1}\sum_{q,q\neq k}^{K}\left(\frac{g(x;\Theta_q)}{g(x;\Theta_k)}\right)^{-\eta}\right\}^{-1/\eta}, & \text{for } s=k \\ -\frac{1}{g(x;\Theta_k)}\frac{\left\{\frac{1}{K-1}\sum_{q,q\neq k}^{K}\left(\frac{g(x;\Theta_q)}{g(x;\Theta_s)}\right)^{-\eta}\right\}^{-1/\eta}}{\sum_{q,q\neq k}^{K}\left(\frac{g(x;\Theta_q)}{g(x;\Theta_s)}\right)^{-\eta}}, & \text{for } s=j\neq k \end{cases} \tag{57}$$

Further, the gradient of the discriminant function $g(x;\Theta_s)$ is given by the following Equations (58) through (62).

$$\partial g(x;\Theta_s)/\partial p_s=-2W_s\Phi_s^2 W_s^T(V_s^{(0)T}x-p_s) \tag{58}$$

$$\partial g(x;\Theta_s)/\partial\phi_{s,i}=2\phi_{s,i}\omega_{s,i}^T(V_s^{(0)T}x-p_s)^2-\{2\delta/\phi_{s,i}(\epsilon\phi_{s,i}^2+\delta)\} \tag{59}$$

$$W_s=[\omega_{s,1},\ \omega_{s,2},\ \ldots,\ \omega_{s,d}] \tag{60}$$

$$\partial g(x;\Theta_s)/\partial\theta_{s,p,q}=2(V_s^{(0)T}x-p_s)^T(\partial W_s/\partial\theta_{s,p,q})\Phi_s^2 W_s^T(V_s^{(0)T}x-p_s) \tag{61}$$

$$\partial W_s/\partial\theta_{s,p,q}=U_{1,2}(\theta_{s,1,2})\ldots U_{p,q-1}(\theta_{s,p,q-1})(\partial U_{p,q}(\theta_{s,p,q})/\partial\theta_{s,p,q})U_{p,q+1}(\theta_{s,p,q+1})\ldots U_{d-1,d}(\theta_{s,d-1,d}) \tag{62}$$

As a result, as an updating equation of the parameter $\Theta_s=(p_s, \phi_s, \theta_s)$ (s=1, 2, ..., K) in the Discriminative Metric

23

Design, there can be the following obtained Equations (63) through (65) from the Equation (32), the Equation (33) and the Equations (54) through (62).

$$p_s^{(t)} = p_s^{(t-1)} + \qquad (63)$$

$$2\epsilon_t \alpha l_k(x_t;\Theta^{(t-1)})\{1 - l_k(x_t;\Theta^{(t-1)})\}\rho_{k,s}(x_t;\Theta^{(t-1)}) \times$$

$$W_s^{(t-1)}\Phi_s^{(t-1)\exp2}W_s^{(t-1)T}(V_s^{(t)T}x_t - p_s^{(t-1)})$$

$$\phi_{s,i}^{(t)} = \phi_{s,i}^{(t-1)} - \qquad (64)$$

$$2\epsilon_t \alpha l_k(x_t;\Theta^{(t-1)})\{1 - l_k(x_t;\Theta^{(t-1)})\}\rho_{k,s}(x_t;\Theta^{(t-1)}) \times$$

$$[\phi_{s,i}^{(t-1)}w_{s,i}^{(t-1)T}(V_s^{(t)T}x_t - p_s^{(t-1)})^2 -$$

$$\delta/\{\phi_{s,i}^{(t-1)}(e\phi_{s,i}^{(t-1)\exp2} + \delta)\}],$$

$$i = 1, 2, \ldots, d$$

$$\phi_{s,p,q}^{(t)} = \phi_{s,p,q}^{(t-1)} - \qquad (65)$$

$$2\epsilon_t \alpha l_k(x_t;\Theta^{(t-1)})\{1 - l_k(x_t;\Theta^{(t-1)})\}\rho_{k,s}(x_t;\Theta^{(t-1)}) \times$$

$$(V_s^{(t)T}x_t - p_s^{(t-1)})^T (\partial W_s/\partial\phi_{s,p,q})^{(t-1)}\Phi_s^{(t-1)\exp2}W_s^{(t-1)T}$$

$$(V_s^{(t)T}x_t - p_s^{(t-1)}),$$
$$p = 1, 2, \ldots, d - 1; q = 2, 3, \ldots, d; p < q$$

In the above-mentioned Equations (63) through (65), the superscript t represents the number of repetition steps, while the superscript exp2 represents a square. On the other hand, $l_k(x_t;\Theta^{t-1})$ is obtained from the Equations (29) and (30), $\rho_{k,s}(x_t;\Theta^{t-1})$ is obtained from the Equation (57), and $(\partial W_s/\partial\theta_{s,p,q})^{(t-1)}$ is obtained by substituting $\theta_{s,p,q}^{(t-1)}$ into $\theta_{s,p,q}$ of the Equation (62). It is to be herein noted that the weighting positive-definite matrix H of the Equation (33) is used as an identity matrix for simplicity. By properly setting the positive-definite matrix H, weighting on the degree of updating of each parameter can be achieved. A center vector $r_s$ of each class is obtained by adjusting the parameter $p_s$. An optimum orthonormal axis $V_s$ of each class is obtained by adjusting the parameter $\theta_s$. An optimum weighting parameter for each class-feature axis can be obtained by adjusting $\phi_s$.

Figure 7:
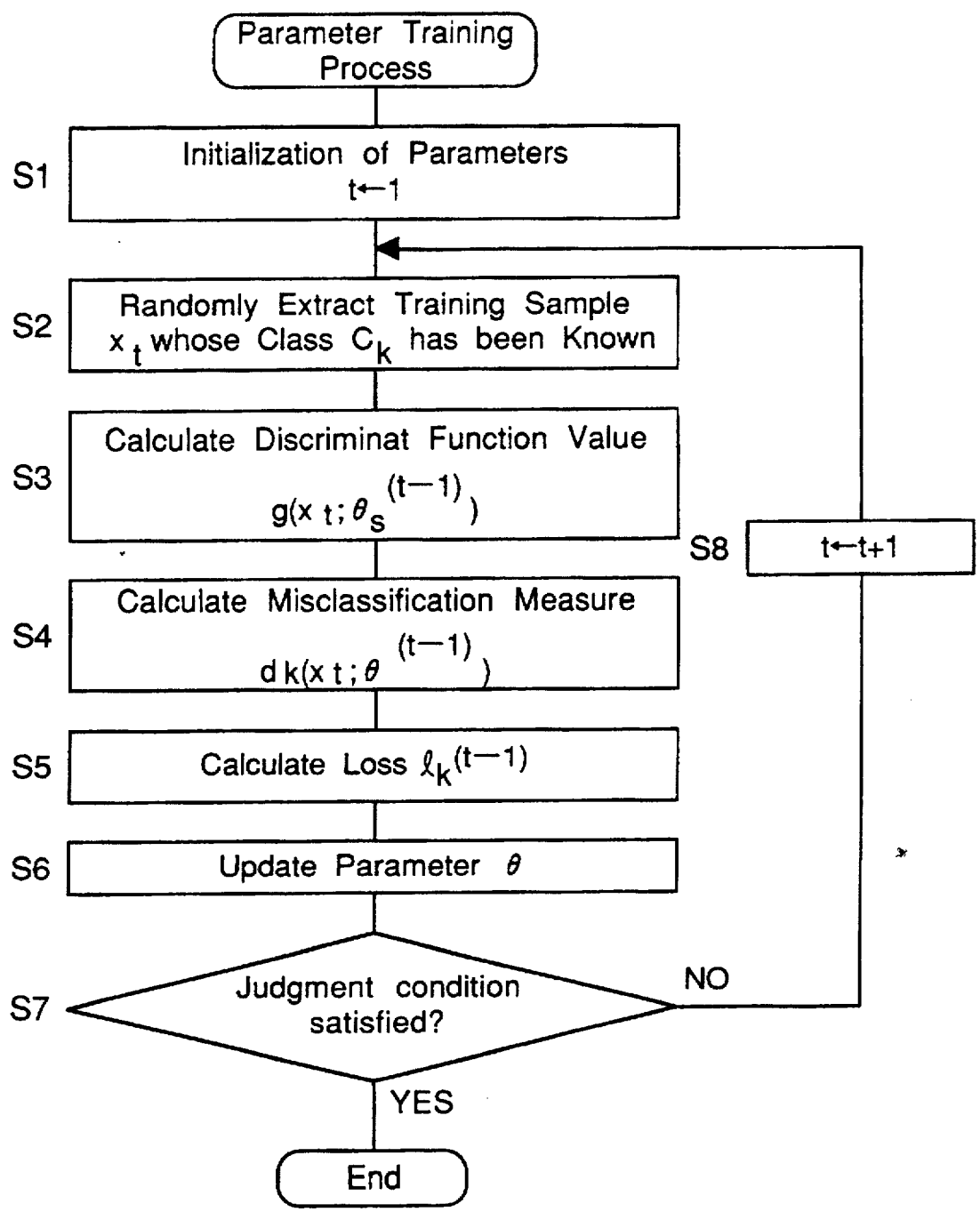
FIG. 7 is a flowchart showing a parameter training process executed by a parameter training controller 20 which is shown in FIG. 1.

FIG. 7 shows a parameter training process which is the basic algorithm of the Discriminative Metric Design eventually executed by the parameter training controller 20.

As shown in FIG. 7, firstly at the Step S1, initialization of each parameter is executed according to the Equations (49) through (52), and an iteration parameter t is initialized to one. Then, at the Step S2, a training sample $x_t$ whose class $C_k$ has been known is extracted randomly. Thereafter, at the Steps S3, S4 and S5, the values of respective parameters are calculated based on the extracted training sample $x_t$. In other words, at the Step S3, the value of a discriminant function $g(x_t; \Theta_s^{(t-1)})$ is calculated according to the Equation (15). At the step S4, a misclassification measure $d_k(x_t; \Theta^{(t-1)})$ is calculated according to the Equation (29). At the step S5, a loss $l_k^{(t-1)}$ is calculated according to the Equation (30). Further, At the Step S6, the parameter $\Theta$ is updated according to the following Equation (66) derived from the Equations (32), (33) and (54).

$$\Theta^{(t)}=\Theta^{(t-1)}-\epsilon_t H\alpha\, l_k^{(t-1)}\{1-l_k^{(t-1)}\}\nabla\Theta d_k(x_t;\Theta^{(t-1)}) \qquad (66)$$

In the above-mentioned Equation (66), the parameter $\Theta$ is expressed by a matrix of a column vector composed of $\Theta_1$, $\Theta_2, \ldots, \Theta_K$, while the parameter $\Theta_s$ is expressed by a matrix of a column vector composed of $p_s$, $\phi_s$, $\theta_s$ (s=1, 2, ..., K). On the other hand, $\nabla\Theta d_k(x_t;\Theta^{(t-1)})$ is expressed by a matrix of a column vector composed of $\nabla\Theta_1 d_k(x_t; \Theta^{(t-1)})$, $\nabla\Theta_2 d_k(x_t;\Theta^{(t-1)}), \ldots, \nabla\Theta_K d_k(x_t;\Theta^{(t-1)})$. Further, $\nabla\Theta_s d_k(x_t;\Theta^{(t-1)})$ is expressed by the following Equation (67).

24

$$\nabla\Theta_s d_k(x_t;\Theta^{(t-1)})=\rho_{k,s}(x_t;\Theta^{(t-1)})\nabla\Theta_s g(x_t;\Theta^{(t-1)}) \qquad (67)$$

In the above-mentioned Equation (67), $\rho_{k,s}(x_t;\Theta^{(t-1)})$ is expressed by the Equation (57). On the other hand, $\nabla\Theta_s g(x_t;\Theta^{(t-1)})$ is expressed by a matrix of a column vector composed of $\partial g(x_t;\Theta_s)/\partial p_s$, $\partial g(x_t;\Theta_s)/\partial\phi_s$, $\partial g(x_t;\Theta_s)/\partial\theta_s$ when $\Theta_s=\Theta_s^{(t-1)}$. It is to be noted that $\partial g(x_t;\Theta_s)/\partial p_s$ is expressed by the Equation (58), while $\partial g(x_t;\Theta_s)/\partial\phi_s$ is expressed by a matrix of a column vector composed of $\partial g(x_t;\Theta_s)/\partial\phi_{s,1}$, $\partial g(x_t;\Theta_s)/\partial\phi_{s,2}, \ldots, \partial g(x_t;\Theta_s)/\partial\phi_{s,d}$ expressed by the Equation (59) . Further, $\partial g(x_t;\Theta_s)/\partial\theta_s$ is expressed by a matrix of a column vector composed of $\partial g(x_t;\Theta_s)/\partial\theta_{s,1,2}$, $\partial g(x_t;\Theta_s)/\partial\theta_{s,1,3}, \ldots, \partial g(x_t;\Theta_s)/\partial\theta_{s,d-1, d}$ in such a condition where p<q, and p and q are within a range of 1, 2, ..., d in the Equation (61).

Further, at the Step S7, it is decided whether or not a decision condition is satisfied. When the decision condition is satisfied, it is decided that the adaptation of the parameter training is completed, and the parameter training operation is completed. Otherwise, when the decision condition is not satisfied, a numeral of one is added to the iteration parameter t to update the parameter at the Step S8, and the program flow proceeds to the step S2 to repeat the above-mentioned operation. In regard to the decision condition, the operation may be completed at the time when the iteration frequency t reaches a predetermined frequency, or the operation may be completed at the time when the degree of reduction of the average loss concerning the set of the training samples becomes smaller than a predetermined value. In a simulation which will be described in detail below, the former is adopted.

(4) Simulation

A simulation of recognizing basic speaker-independent Japanese five vowels was performed by means of a signal pattern recognition apparatus of the present preferred embodiment. The object of the present simulation is to verify the feasibility of the Discriminative Metric Design. In comparison with the conventional generic signal pattern recognition apparatus based on the Mahalanobis distance measure and an LVQ signal pattern recognition apparatus representative of the multi-template distance classifier, the effectiveness of the Discriminative Metric Design adopted by the present preferred embodiment will be corroborated.

In the present simulation, a labeled signal pattern whose class has been known is referred to as a "token" hereinafter. As a vowel token, there is used speech data obtained by sampling and quantizing 512 isolated words spoken by 70 speakers including 36 males and 34 females at a sampling frequency of 12 kHz in 16 quantization bits. A hamming window is taken by multiplication out of a frame in 10 msec. about a center portion of each vowel segment, i.e., a frame having a frame length of 20 msec., and then subjected to an LPC cepstrum analysis. The resulting cepstrum coefficient is used as an inputted token, or an inputted signal pattern for the signal pattern recognition apparatus. According to the present simulation, an LPC degree and a cepstrum degree are each set to 32. In other words, each inputted token is a 32-dimensional single LPC cepstrum spectrum. Data of 50 persons out of the 70 speakers are used as a set of the training samples for the signal pattern recognition apparatus, and two groups each composed of 10 persons out of the remaining 20 persons are used as two types of test sets. Test recognition results of the two types are referred to as a Test 1 and a Test 2, respectively. The number of the training tokens is about 7500, and the number of tokens in each test set is about 1500. A training process for optimizing the parameters of the signal pattern recognition apparatus is as follows.

First of all, speech waveform data corresponding to respective vowels is taken out of the 512 training-use isolated word speech data of 50 persons, and information of the relevant class, i.e., any of the five vowels is incorporated to the data to form a training-use speech waveform data set. Thereafter, each speech waveform of the training speech waveform data set is inputted to the feature extraction section 201 of the signal pattern recognition apparatus of the present preferred embodiment of the present invention. The feature extraction section 201 converts each speech waveform of the inputted training-use speech waveform data set into a 32-dimensional LPC cepstrum coefficient spectrum $x_n$ (n=1, 2, ..., N), and outputs the resulting data to the signal pattern training controller 20. Then, the signal pattern recognition apparatus is set to the training mode, and the signal pattern training controller 20 executes the parameter training process as shown in FIG. 7. In the present case, s=1, 2, ..., 5, and K=5. After the training process is completed, the signal pattern recognition apparatus is set to the recognition mode. Then the feature extraction section 201, the feature converters 10-1 through 10-K, the discriminant function calculators 11-1 through 11-K, and the selector 12 are made to operate, thereby executing the signal pattern recognition process on the training set as well as the Test 1 and the Test 2. Table 1 shows a result of the simulation. In Table 1 are shown error probabilities of speech recognition executed by the signal pattern recognition apparatus of the present preferred embodiment provided with the classifier which uses the Discriminative Metric Design based on the quadric discriminant function (the classifier including the feature converter and the discriminant function calculator of the present preferred embodiment will be referred to as a DMD classifier hereinafter), the conventional Mahalanobis distance classifier, and the conventional LVQ classifier having a plurality of templates based on the Euclidean distance.

TABLE 1

Error probabilities of speech recognition in tasks of Japanese five vowels

|  | Training set | Test 1 | Test 2 |
|---|---|---|---|
| DMD classifier | 3.84% | 8.78% | 10.59% |
| Mahalanobis distance classifier | 8.80% | 13.10% | 15.42% |
| LVQ classifier (with one template) | 10.51% | 10.93% | 15.62% |
| LVQ classifier (with eight templates) | 5.00% | 14.38% | 12.93% |
| LVQ classifier (with 16 templates) | 3.46% | 16.41% | 13.40% |

As is apparent from Table 1, the DMD classifier of the present preferred embodiment exhibits a speech recognition accuracy higher than any of the conventional Mahalanobis distance classifier and the conventional LVQ classifiers. Furthermore, it can be understood that, even when one template is used, the DMD classifier of the present preferred embodiment which provides a unique feature metric space for each class increases the robustness of the signal pattern recognition apparatus in comparison with the case where the number of templates is increased in the conventional LVQ classifier.

(5) Difference between the Discriminative Metric Design of the present preferred embodiment and the other methods As described hereinbefore in the item of (3-3) the metric training by the principal component analysis, a method for performing the principal component analysis of the set of the training samples in respective classes can be enumerated as the simplest method in regard to the metric training. In the case of a classifier based on the quadric discriminant function, the Gaussian discriminant function or the Mahalanobis distance can be enumerated as the representatives of the discriminant function trained according to the metric training method based on the principal component analysis. However, as described hereinbefore, the principal component analysis is insufficient in terms of achieving the essential object of minimizing the recognition error of the signal pattern recognition apparatus since the training is performed independently in each class and the metric training is achieved without taking into account the influence of the other classes. The above-mentioned fact has been corroborated by the above-mentioned simulation.

Recently, there is a growing trend of recognizing a Gaussian distribution type Hidden Markov Model (HMM) speech signal pattern recognition apparatus based on the training according to the Minimum Classification Error/Generalized Probabilistic Descent method as a method for achieving a high-accuracy speech recognition (See, for example, W. Chou, B. H. Juang, and C. H. Lee, "Segmental GPD training of HMM based speech recognizer", Proceedings of ICASSP 92, Vol. 1, pp. 473-476, 1992 (referred to as a Reference Document 10 hereinafter) or D. Rainton and S. Sagayama, "Minimum error classification training of HMMs—implementation details and experimental results", Japanese Acoustic Society Japan, (E), Vol. 13, No. 6, pp. 379-387, November, 1992 (referred to as a Reference Document 11 hereinafter). Conventionally, there is generally used a mixture Gaussian distribution type HMM which can handle only the Gaussian distribution of the diagonal covariance matrix in order to allow the application of a Generalized Probabilistic Descent method, and assigns a plurality of diagonal covariance Gaussian distributions to each class in order to perform modeling of a signal pattern variation. Eventually, the above-mentioned apparatus is substantially equal to the multi-template distance classifier (LVQ) which assigns a plurality of reference vectors to each class. However, as described hereinbefore in the items of (2-1-1) Maximum a posteriori probability decision method and (2-1-2) Discriminant function method, an increase of the number of reference vectors having a single Gaussian distribution and the robustness with respect to an unknown sample are in a trade-off relationship. Therefore, it is difficult to decide the optimum number of reference vectors for the recognition of an unknown sample. As is easily presumed, the Discriminative Metric Design based on the quadric discriminant function can be substantially applied to the Gaussian distribution type HMM classifier based on the quadric discriminant function. In particular, the arrangement that the orthogonal matrix $V_s$ which is a class-feature axis can be adjusted allows the optimization according to the generic HMM Minimum Classification Error/Generalized Probabilistic Descent method having a Gaussian distribution based on a generic covariance matrix, not limited to the diagonal matrix. The above-mentioned simulation result indicates the fact that the means for training the unique feature metric space of each class according to the Discriminative Metric Design improves the recognition accuracy concerning an unknown sample in comparison with the means for assigning a plurality of reference vectors. Presumably, the above-mentioned fact provides a new knowledge in considering the robustness of the HMM speech signal pattern recognition apparatus with respect to an unknown sample.

The linear transformation $L_{ij}$ according to the Discriminative Metric Design executed in each class can be also regarded as a feature extraction process. A recently proposed discriminative feature extraction method (See A. Biem and S. Katagiri, "Feature extraction based on minimum classification error/generalized probabilistic descent method", Proceedings of ICASSP 93, Vol. 2, pp. 275–278, April, 1993 (referred to as a Reference Document 12 hereinafter) is a method for synthetically training both the feature extraction process and the classifying process according to the Minimum Classification Error/Generalized Probabilistic Descent method, thereby solving a mismatch between both the processes for the original purpose of minimizing the recognition error of the recognizer. However, in contrast to the fact that a common feature space is given to every class according to the discriminative feature extraction method, a unique feature metric space is provided for each class according to the Discriminative Metric Design used by the present preferred embodiment. Furthermore, according to the Reference Document 12, the optimization of only the weighting of each cepstrum coefficient is performed. However, according to the Discriminative Metric Design, not only the weighting but also the orthogonal axes of the feature metric space can be adjusted. In the above-mentioned point, the Discriminative Metric Design is different from the discriminative feature extraction method.

In a manner similar to that of the Discriminative Metric Design, there are proposed a Subspace method (See the Reference Document 1), a Multiple Similarity method relevant to the above-mentioned method (See Taizou Iijima, "Pattern recognition theory", Morikita Shuppan, 1989 (referred to as a Reference Document 13 hereinafter), a Learning Subspace method (See the Reference Document 1), a Compound Similarity method (See the Reference Document 13) are proposed each as a classifying method for classifying a signal pattern by providing a unique feature space for each class. The above-mentioned four methods are to assign a "Subspace" representing each class feature to each class, and adopts an "orthogonal projection" of an inputted signal pattern to each Subspace as a discriminant function. It is to be noted that, according to the Multiple Similarity method and the Compound Similarity method, weighting is effected on each basis vector of each Subspace. Herein, for simplicity, the above-mentioned four methods are generally referred to as a projection-based classification method.

The Discriminative Metric Design and the projection-based classification method fundamentally differ from each other in the type of inputted signal patterns to be handled. The projection-based classification method which uses the orthogonal projection as a discriminant function can be applied only to a signal pattern whose class does not change if the signal pattern is multiplied by a fixed number. On the other hand, the Discriminative Metric Design based on the distance function can handle arbitrary types of signal patterns by making orthonormal a signal pattern as described above by the size. In other words, the projection-based classification method can be applied to an original speech waveform, an image signal pattern, a power spectrum, and the like, however, the method can not be applied to a logarithmic power spectrum, a cepstrum, an LPC coefficient, and the like. In contrast to the above, the Discriminative Metric Design adopted by the present preferred embodiment can handle any of the above-mentioned signal patterns. Furthermore, the Discriminative Metric Design and the projection-based classification method differ from each other in the handling of the class-feature axis. According to the projection-based classification method, the class-feature axis has a significant meaning as a template of each class, and corresponds to the reference vector of the Discriminative Metric Design method (or the LVQ classifier). On the other hand, the Discriminative Metric Design of the present preferred embodiment handles the class-feature axis as a mapping from the original signal pattern space to each class feature metric space. In other words, only the class template is trained according to the projection-based classification method in a manner similar to that of the LVQ classifier. In contrast to the above, both of the template and the feature metric space are trained according to the Discriminative Metric Design of the present preferred embodiment of the present invention.

(6) Advantageous Effects

According to the present preferred embodiment as described above, there is adopted the Discriminative Metric Design which is a method for training the feature metric space for effectively expressing the unique feature of each class, or the metric of the unique discriminant function of each class in a discriminating manner, or so that the recognition error is reduced as a new method for training a signal pattern recognition apparatus with high accuracy for an unknown sample different from the training samples of the signal pattern recognition apparatus. Therefore, in contrast to the fact that the similarity evaluation has been performed in a feature space common to every class, the evaluation is performed in a unique feature metric space that is provided for each class and expresses the feature of each class in the present preferred embodiment. Therefore, the variation factor is suppressed even for an unknown sample, thereby improving the recognition capability. Furthermore, the structure of the present preferred embodiment is relatively simple. By adopting the Minimum Classification Error/Generalized Probabilistic Descent method of which effectiveness as a signal pattern classifier training method intended for maximizing the recognition rate has been known, a discriminant function metric really essential to the recognition can be obtained.

(7) Modification examples

Although the signal pattern recognition apparatus to be applied to a speech recognition apparatus has been described in the above-mentioned preferred embodiments, the present invention is not limited to this, and the signal pattern recognition apparatus may be applied to a character recognition apparatus or an image recognition apparatus. It is to be noted that, in the case of the character recognition apparatus or the image recognition apparatus, instead of the microphone 200 and the feature extraction section 201, it is required to provide an image scanner for converting a character which is handwritten, typed, or printed on a sheet of paper, or an image such as an image signal pattern, into a dot image signal pattern and outputting the converted signal pattern to the feature converters 10-1 through 10-K and the signal pattern training controller 20. In the above-mentioned case, after training the apparatus with a predetermined character or image signal pattern provided for the training, a character recognition or an image recognition can be performed.

It is to be noted that, instead of providing the feature extraction section 201 in the speech recognition apparatus, audio data obtained by converting a speech signal waveform obtained in the microphone 200 through an analog to digital conversion process may be directly used as an inputted signal pattern.

Although the feature extraction section 201 converts the inputted speech signal into a 32-dimensional LPC cepstrum coefficient vector in the above-mentioned preferred embodiment, the present invention is not limited to this. In the case of the speech recognition apparatus, the signal may be converted into another speech feature parameter such as a power spectrum and a logarithmic power spectrum to be used as an inputted signal pattern x.

Although the quadric discriminant function is used as a discriminant function representing the similarity measure of each class in the above-mentioned preferred embodiment, the present invention is not limited to this, and a discriminant function as follows may be used instead.

(a) A discriminant function which gives a plurality of center vectors to each class and represents a distance between an inputted signal pattern and each of the center vectors in a manner similar to that of the Reference Document 4 is used.

(b) A discriminant function which represents an angle between vectors of an inputted signal pattern and a reference signal pattern such as a feature parameter in a natural number n-dimension is used.

(c) A discriminant function representing a likelihood, i.e., a density function value of an inputted signal pattern is used.

In the above-mentioned preferred embodiment, the selector 12 outputs the information of the class corresponding to the discriminant function calculator which outputs the minimum discriminant function value among a plurality of K discriminant function values. However, the present invention is not limited to this. In a case where the similarity measure of a class is high when the discriminant function value is great, the selector is arranged so that the information of the class corresponding to the discriminant function calculator which outputs the maximum discriminant function value among a plurality of K discriminant function values is outputted as a classification result.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A signal pattern recognition apparatus for classifying an inputted signal pattern into one of a plurality of predetermined classes so as to recognize the inputted signal pattern, comprising:

a plurality of feature transformation means for respectively transforming the inputted signal pattern into vectors in a plurality of feature spaces corresponding respectively to said classes by executing a feature transformation process by means of a predetermined transformation parameter corresponding to each of said classes so as to emphasize a feature of each of said classes, said feature transformation means being provided respectively for said plurality of classes;

a plurality of discriminant function means for respectively calculating a value of a discriminant function by means of a predetermined discriminant function representing a similarity measure of each of said classes for said vectors in said plurality of feature spaces which are transformed by said plurality of feature transformation means, said discriminant function means being provided respectively for said plurality of classes;

selection means for executing a signal pattern recognition process by selecting a class to which the inputted signal pattern belongs based on the values of said plurality of discriminant functions corresponding respectively to said classes, said discriminant functions being obtained through said calculation executed by said plurality of discriminant function means; and training control means for training and setting said plurality of transformation parameters of said feature transformation process and said plurality of discriminant functions, so that an error probability of said signal pattern recognition is minimized based on a predetermined training signal pattern.

2. The signal pattern recognition apparatus as claimed in claim 1, wherein each of said plurality of feature transformation means linearly transforms the inputted signal pattern into vectors in said plurality of feature spaces corresponding respectively to said classes by projecting the inputted signal pattern onto a predetermined basis vector and multiplying a resulting vector by a predetermined real number.

3. The signal pattern recognition apparatus as claimed in claim 1, wherein each of said plurality of discriminant functions of the discriminant function means is a predetermined quadric discriminant function representing the similarity measure of each of said classes.

4. The signal pattern recognition apparatus as claimed in claim 1, wherein said training control means performs adaptation of said plurality of transformation parameters of said feature transformation process and said plurality of discriminant functions of the discriminant function means, so that the error probability of said signal pattern recognition is minimized, based on said predetermined training signal pattern, by means of an adaptive minimization method utilizing a probabilistic descent theorem.

5. The signal pattern recognition apparatus as claimed in claims 1, further comprising:

signal conversion means for converting an inputted speech into a speech signal and outputting the speech signal; and feature extraction means for converting the speech signal outputted from said signal conversion means into a predetermined speech feature parameter, and outputting the obtained feature parameter as a signal pattern to said plurality of feature transformation means and said training control means, thereby recognizing the inputted speech.

6. The signal pattern recognition apparatus as claimed in claim 5, wherein said feature extraction means transforms the speech signal outputted from said signal conversion means into LPC cepstrum coefficient vectors through linear prediction analysis, and outputting resulting vectors as a signal pattern to said plurality of feature transformation means and said training control means.

7. The signal pattern recognition apparatus as claimed in claim 1, further comprising:

image conversion means for converting a character into dot image data, and outputting the dot image data as a signal pattern to said plurality of feature transformation means and said training control means, thereby recognizing the character.

8. The signal pattern recognition apparatus as claimed in claim 1, further comprising:

further image conversion means for converting an image into dot image data, and outputting the dot image data as a signal pattern to said plurality of feature transformation means and said training control means, thereby recognizing the image.

9. A method for classifying an inputted signal pattern into one of a plurality of predetermined classes so as to recognize the inputted signal pattern, including the following steps of:

transforming the inputted signal pattern into vectors in a plurality of feature spaces corresponding respectively to said classes by executing a feature transformation process by means of a predetermined transformation parameter corresponding to each of said classes so as to emphasize a feature of each of said classes;

calculating a value of a discriminant function by means of a predetermined discriminant function representing a similarity measure of each of said classes for said vectors in said plurality of feature spaces which are obtained through said feature transformation process;

executing a signal pattern recognition process by selecting a class to which the inputted signal pattern belongs based on the calculated values of said plurality of discriminant functions corresponding respectively to said classes; and training and setting the transformation parameter of said feature transformation process and each of said discriminant functions, so that an error probability of said signal pattern recognition is minimized based on a predetermined training signal pattern.

10. The method as claimed in claim 9, wherein said transforming step includes a step of linearly transforming the inputted signal pattern into vectors in said plurality of feature spaces corresponding respectively to said classes by projecting the inputted signal pattern onto a predetermined basis vector and multiplying resulting vectors by a predetermined real number.

11. The method as claimed in claim 9, wherein each of said discriminant functions is a predetermined quadric discriminant function representing the similarity measure of each of said classes.

12. The method as claimed in claim 9, wherein said training step includes a step of performing adaptation of the transformation parameter of said feature transformation process and said discriminant functions, so that the error probability of said signal pattern recognition is minimized, based on the predetermined training signal pattern, by means of an adaptive minimization method utilizing a probabilistic descent theorem.

13. The signal pattern recognition apparatus as claimed in claim 1, further comprising a feature extraction section for receiving a first signal from an input device and for producing said inputted signal pattern, said feature extraction section extracting vectors of features parameters from said first signal, such that data representing said extracted vectors are included in said inputted signal pattern.

14. The signal pattern recognition apparatus as claimed in claim 1, wherein said training control means is connected to receive the inputted signal pattern, so as to train and set said plurality of transformation parameters of said feature transformation process and said plurality of discriminant functions.

15. The signal pattern recognition apparatus as claimed in claim 1, wherein a unique feature metric space is provided for each class.

16. The method as claimed in claim 9, further comprising the step of:

extracting vectors of feature parameters from an initial signal and producing the inputted signal pattern based upon the extracted vectors.

* * * * *